United States Patent
Tomasiak et al.

(10) Patent No.: US 10,702,111 B2
(45) Date of Patent: Jul. 7, 2020

(54) ATTACHMENT MECHANISM FOR VACUUM CLEANER ACCESSORIES

(71) Applicant: Emerson Electric Co., St. Louis, MO (US)

(72) Inventors: Mark J. Tomasiak, St. Peters, MO (US); Matthew A. Williams, Bridgeton, MO (US); Greg Wilsey, Wildwood, MO (US); John Wolford, Ellisville, MO (US)

(73) Assignee: Emerson Electric Co., St. Louis, MO (US)

( * ) Notice: Subject to any disclaimer, the term of this patent is extended or adjusted under 35 U.S.C. 154(b) by 176 days.

(21) Appl. No.: 15/875,533

(22) Filed: Jan. 19, 2018

(65) Prior Publication Data

US 2019/0223671 A1    Jul. 25, 2019

(51) Int. Cl.
  *A47L 9/02*    (2006.01)
  *A47L 9/24*    (2006.01)
  *A47L 5/36*    (2006.01)
  *F16L 37/096*  (2006.01)

(52) U.S. Cl.
  CPC ...... *A47L 9/02* (2013.01); *A47L 5/36* (2013.01); *A47L 9/242* (2013.01); *F16L 37/096* (2013.01); *Y10S 285/921* (2013.01)

(58) Field of Classification Search
  CPC .... A47L 5/36; A47L 9/02; A47L 9/242; F16L 37/0847; F16L 37/096
  USPC .............. 285/7, 320, 308, 305, 317, 319
  See application file for complete search history.

(56) References Cited

U.S. PATENT DOCUMENTS

| | | | | |
|---|---|---|---|---|
| 3,394,954 A | * | 7/1968 | Sarns | A61M 39/10 285/319 |
| 4,669,755 A | * | 6/1987 | Harris | A47L 9/242 285/12 |
| 4,682,798 A | * | 7/1987 | Sauer | F16L 33/221 285/148.13 |
| 4,964,189 A | | 10/1990 | Rau et al. | |
| 5,799,986 A | * | 9/1998 | Corbett | B29C 45/1671 285/133.21 |
| 6,115,881 A | | 9/2000 | Hult et al. | |
| 6,834,888 B2 | * | 12/2004 | Campau | F16L 37/138 285/320 |
| 7,134,694 B2 | | 11/2006 | Young et al. | |

(Continued)

*Primary Examiner* — Joseph J Hail
*Assistant Examiner* — Arman Milanian
(74) *Attorney, Agent, or Firm* — Armstrong Teasdale LLP

(57) ABSTRACT

An attachment mechanism for connecting vacuum cleaner accessories includes a plurality of teeth arranged axially along an outer surface of an outer attachment tube of a first vacuum cleaner accessory, and a locking tab positioned on an outer surface of an inner attachment tube of a second vacuum cleaner accessory. The locking tab includes a pivot extension extending radially outward from the outer surface of the second vacuum cleaner accessory, and a latch pivotably connected to the pivot extension. The latch includes a finger engagement portion and a latching portion located on opposite sides of the pivot extension. The latching portion includes a latch tooth that extends from a bottom surface of the latching portion. The latch tooth is positioned to engage the teeth upon insertion of the inner attachment tube into the outer attachment tube to secure the first vacuum cleaner accessory to the second vacuum cleaner accessory.

21 Claims, 26 Drawing Sheets

(56) References Cited

U.S. PATENT DOCUMENTS

| | | | |
|---|---|---|---|
| 9,764,105 B2* | 9/2017 | Donenfeld | A61M 16/0051 |
| 10,173,044 B2* | 1/2019 | Groepper | A61M 39/10 |
| 2008/0184517 A1 | 8/2008 | Phelan et al. | |
| 2016/0120383 A1* | 5/2016 | Stanek | A47L 9/242 |
| | | | 15/300.1 |

* cited by examiner

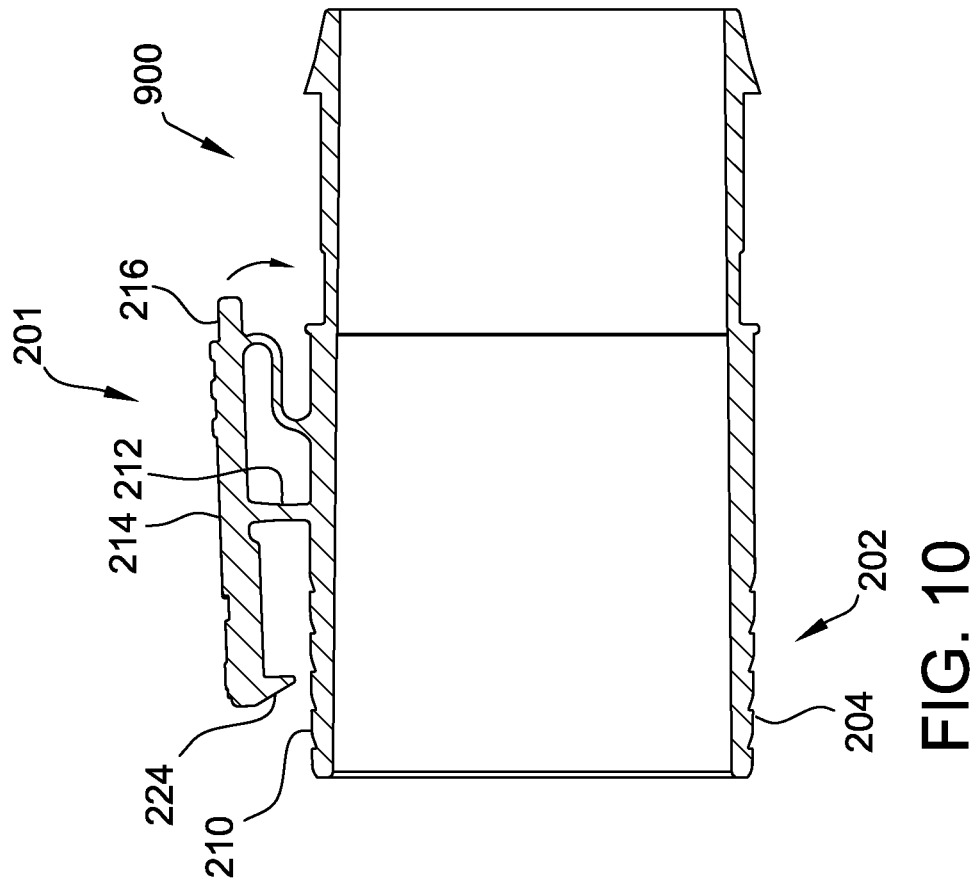
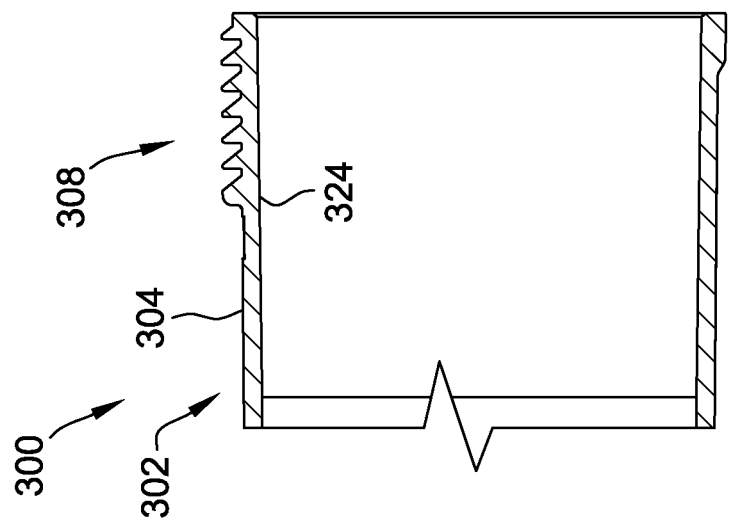
FIG. 10

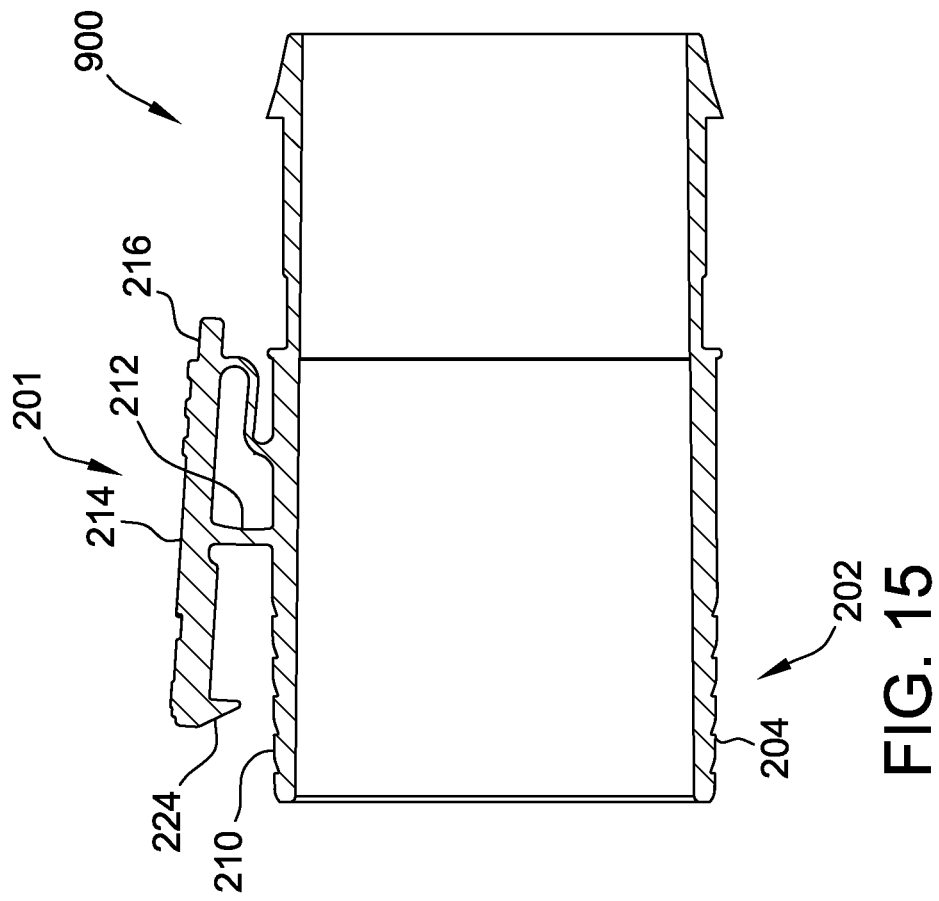
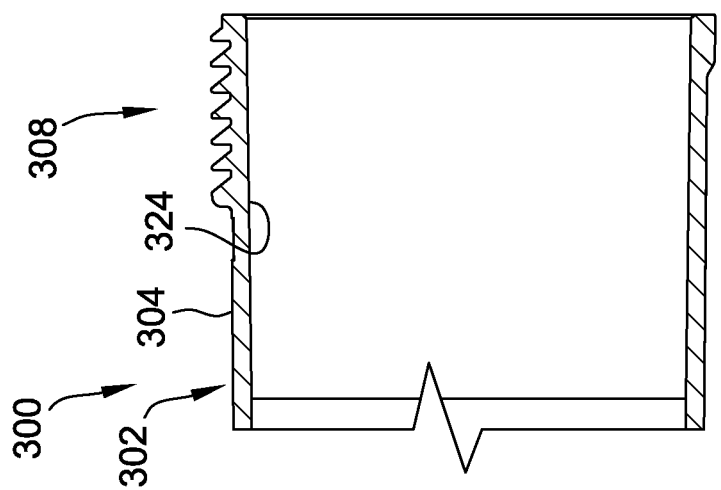
FIG. 15

ATTACHMENT MECHANISM FOR VACUUM CLEANER ACCESSORIES

FIELD

The field of the disclosure relates generally to vacuum cleaning systems, and more particularly, to attachment mechanisms for vacuum cleaner accessories.

BACKGROUND

Vacuum cleaners generally include a suction unit, a cleaning tool for engaging a surface for cleaning, and a vacuum cleaner hose or tube assembly for directing the cleaning tool and providing suction to the cleaning tool. The cleaning tool is connected to a distal end of the vacuum cleaner hose or tube assembly, and a user may direct the vacuum cleaner hose or tube assembly to the surface to be cleaned such that the cleaning tool engages and cleans the surface.

Some vacuum cleaner accessories, such as cleaning tools, hoses, tubes, and conduits, include attachment mechanisms that permit selective attachment of different accessories to the same hose or tube assembly, for example, to accommodate different cleaning tasks. For certain applications, known attachment mechanisms provide a less than optimal seal between the accessory and the hose or tube assembly.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vacuum cleaning system includes an inlet port, an outlet port, and a suction unit fluidly connected between the inlet port and the outlet port and operable to generate air flow from the inlet port to the outlet port. The vacuum cleaning system further includes a first vacuum cleaner accessory fluidly connected to the inlet port, and a second vacuum cleaner accessory fluidly connected to the inlet port. The first vacuum accessory includes an inner attachment tube, and the second vacuum cleaner accessory includes an outer attachment tube. The outer attachment tube is sized and shaped to receive the inner attachment tube therein. The first vacuum cleaner accessory is connected to the second vacuum cleaner accessory by an attachment mechanism that includes a plurality of teeth arranged axially along an outer surface of the outer attachment tube, and a locking tab positioned on an outer surface of the inner attachment tube. The locking tab includes a pivot extension extending radially outward from the outer surface of the inner attachment tube, and a latch pivotably connected to the pivot extension. The latch includes a finger engagement portion and a latching portion located on opposite sides of the pivot extension. The latching portion includes a latch tooth that extends from a bottom surface of the latching portion. The latch tooth is positioned to engage at least one of the plurality of teeth upon insertion of the inner attachment tube into the outer attachment tube to secure the first vacuum cleaner accessory to the second vacuum cleaner accessory.

In another aspect, an attachment mechanism for connecting a first vacuum cleaner accessory to a second vacuum cleaner accessory includes a plurality of teeth arranged axially along an outer surface of an outer attachment tube of the first vacuum cleaner accessory, and a locking tab positioned on an outer surface of an inner attachment tube of the second vacuum cleaner accessory. The outer attachment tube is sized and shaped to receive the inner attachment tube therein. The locking tab includes a pivot extension extending radially outward from the outer surface of the second vacuum cleaner accessory, and a latch pivotably connected to the pivot extension. The latch includes a finger engagement portion and a latching portion located on opposite sides of the pivot extension. The latching portion includes a latch tooth that extends from a bottom surface of the latching portion. The latch tooth is positioned to engage at least one of the plurality of teeth upon insertion of the inner attachment tube into the outer attachment tube to secure the first vacuum cleaner accessory to the second vacuum cleaner accessory.

In another aspect, a method of connecting a first vacuum cleaner accessory including an outer attachment tube to a second vacuum cleaner accessory including an inner attachment tube is provided. The first vacuum cleaner accessory includes a plurality of teeth arranged axially along an outer surface of the outer attachment tube, and the second vacuum cleaner accessory includes a locking tab positioned on an outer surface of the inner attachment tube. The locking tab includes a pivot extension extending from the outer surface of the second vacuum cleaner accessory and a latch pivotably connected to the pivot extension. The latch includes a finger engagement portion and a latching portion located on opposite sides of the pivot extension. The latching portion includes a latch tooth that extends from a bottom surface of the latching portion. The method includes aligning the outer attachment tube of the first vacuum cleaner accessory with the inner attachment tube of the second vacuum cleaner accessory, inserting the inner attachment tube into the outer attachment tube to a sufficient depth such that the inner attachment tube sealingly engages the outer attachment tube, and engaging at least one of the plurality of teeth with the latch tooth to secure the first and second vacuum accessories together in a sealed connection.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 10 is a sectional view of the hose adapter of FIG. 2 and the vacuum tube of FIG. 4 during a first stage of an example method of connecting the hose adapter to the vacuum tube.

FIG. 15 is a sectional view of the hose adapter of FIG. 2 and the vacuum tube of FIG. 4 during a second stage of the example method of disconnecting the hose adapter from the vacuum tube.

Corresponding reference characters indicate corresponding parts throughout the several views of the drawings.

DETAILED DESCRIPTION

Figure 1:
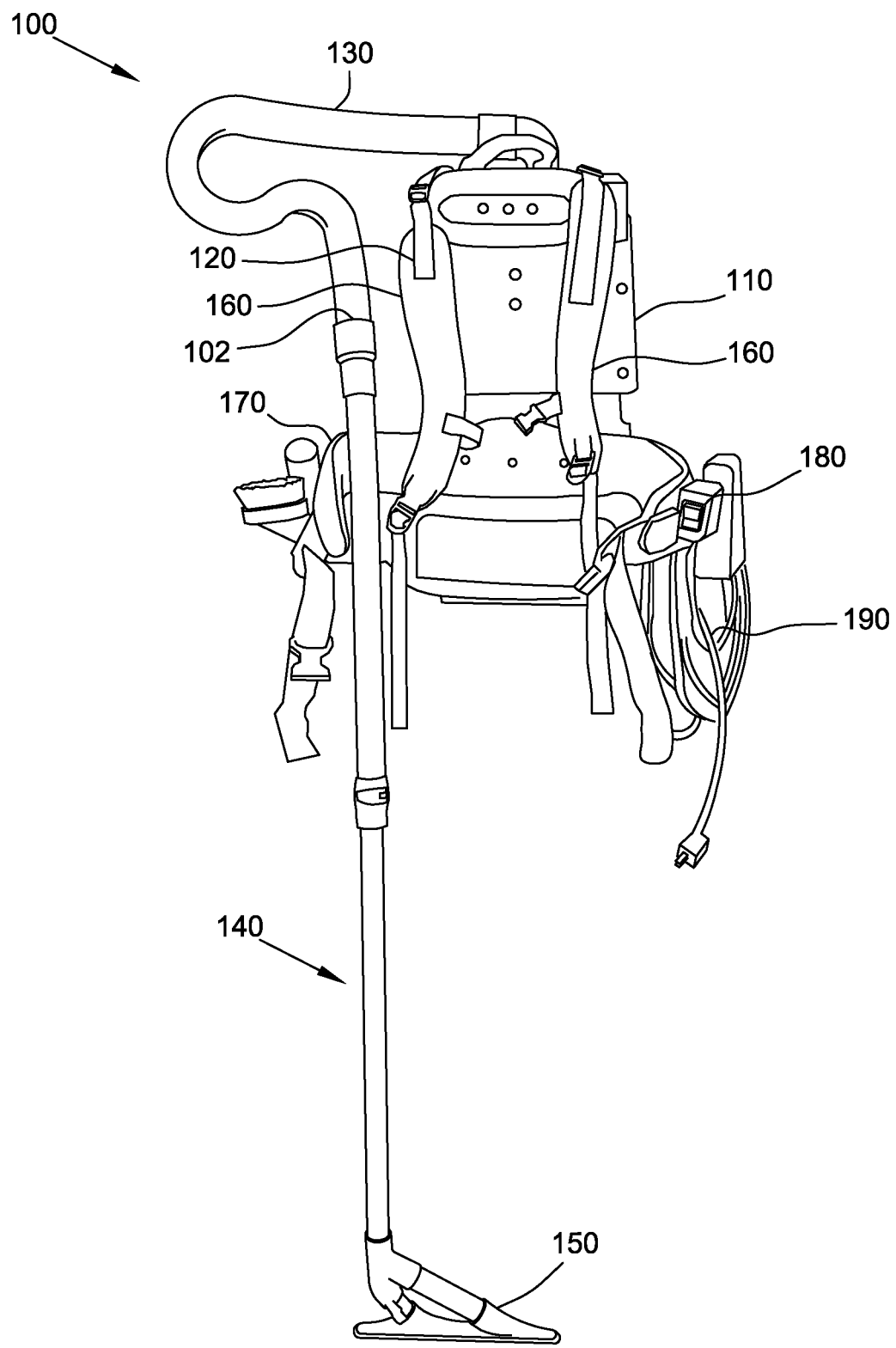
FIG. 1 is a perspective view of an example vacuum cleaning system including an attachment mechanism for connecting vacuum cleaner accessories to one another.

FIG. 1 is a perspective view of an example vacuum cleaning system 100, shown in the form of a backpack vacuum cleaner. Vacuum cleaning system 100 includes an attachment mechanism 102 to facilitate connecting two or more vacuum cleaner accessories together such that a seal is formed between the accessories "sealingly connecting" the accessories). As used herein, the term "vacuum cleaner accessory" or "vacuum accessory" refers to a component of a vacuum cleaner that is connected, directly or indirectly, to a vacuum cleaner inlet port or outlet port to direct airflow generated by the vacuum cleaner. Examples of vacuum cleaner accessories include, for example and without limitation, vacuum conduits, vacuum hoses, vacuum wands or tubes, and surface cleaning tools. Although the vacuum cleaning system 100 is shown and described with reference to a backpack vacuum cleaner, vacuum cleaning system 100 and features thereof may be embodied in vacuum cleaners other than backpack vacuum cleaners including, for example and without limitation, canister vacuum cleaners, wet/dry vacuum cleaners, and upright vacuum cleaners. In the example embodiment, vacuum cleaning system 100 generally includes a suction unit 110 that is carried on a user's back via a backpack assembly 120, a vacuum cleaner hose 130, a vacuum tube assembly 140, and a surface cleaning tool 150.

The suction unit 110 generally includes a fan and a motor (not shown) operatively connected to the fan to drive the fan and generate suction or negative pressure to permit debris and other material to be collected via vacuum tube assembly 140 and surface cleaning tool 150. The suction unit 110 may also include one or more filter assemblies and a debris container to collect and store debris collected with vacuum cleaning system 100. The vacuum cleaner hose 130 extends from a top of the suction unit 110 and is connected to vacuum tube assembly 140 to permit fluid communication between the suction unit 110 and vacuum tube assembly 140. Surface cleaning tool 150 is connected to a distal end of vacuum tube assembly 140 such that surface cleaning tool 150 can be manipulated with vacuum tube assembly 140 to engage surfaces for cleaning. Although surface cleaning tool 150 is a floor cleaning tool in the example embodiment, surface cleaning tool 150 may be used to clean surfaces other than floor surfaces. Moreover, vacuum cleaning system 100 may include any other suitable surface cleaning tool connected to the distal end of vacuum tube assembly 140 that enables vacuum cleaning system 100 to function as described herein.

Backpack assembly 120, which carries the suction unit 110, includes shoulder straps 160 and a waist belt 170 for securing the backpack assembly 120 to the torso of a user. In the example embodiment, vacuum cleaning system 100 also includes a switch assembly 180 and a power cord assembly 190. Switch assembly 180 enables suction unit 110 to be turned on and off. In some embodiments, switch assembly 180 may be a variable position switch assembly such that switch assembly 180 provides control of the operating speed of suction unit 110. Power cord assembly 190 provides power to suction unit 110.

Figure 2:
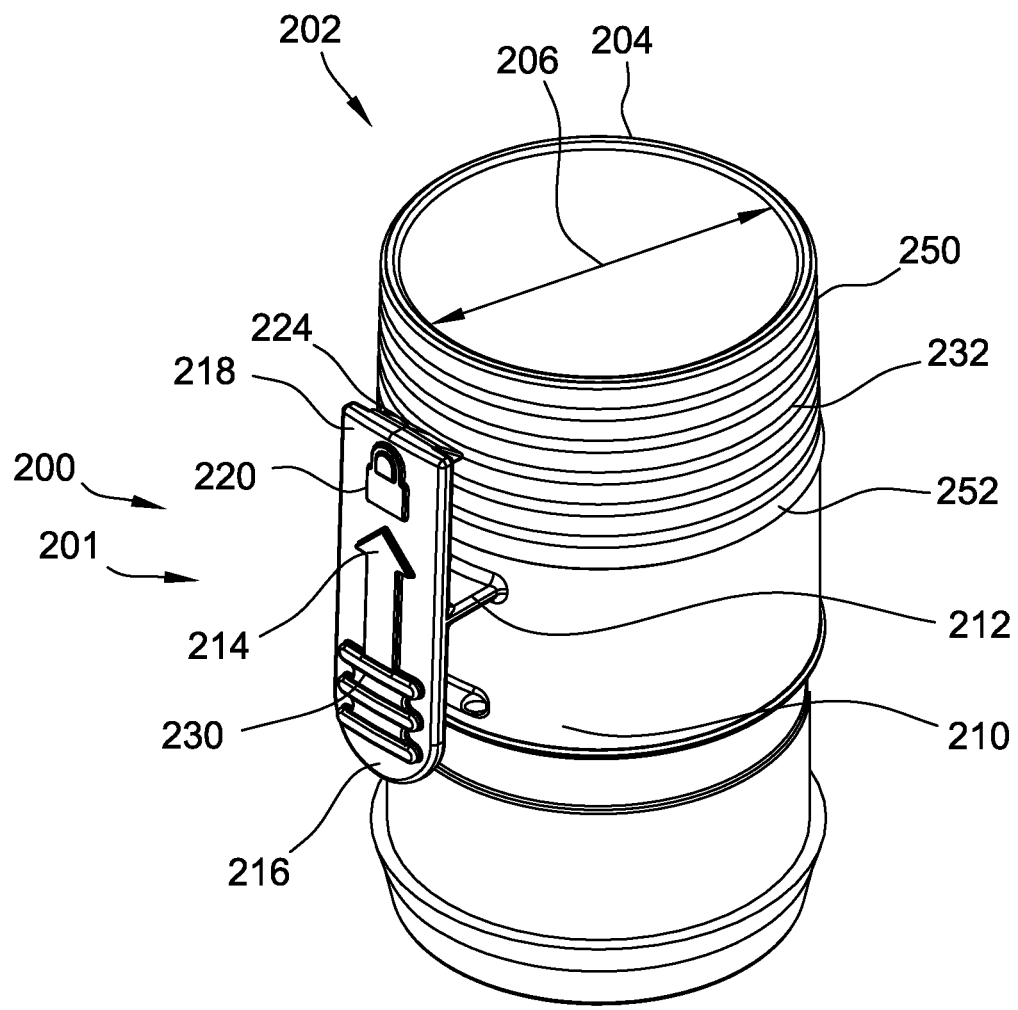
FIG. 2 is a perspective view of an example vacuum cleaner accessory in the form of a hose adapter including an example vacuum locking tab.
Figure 3:
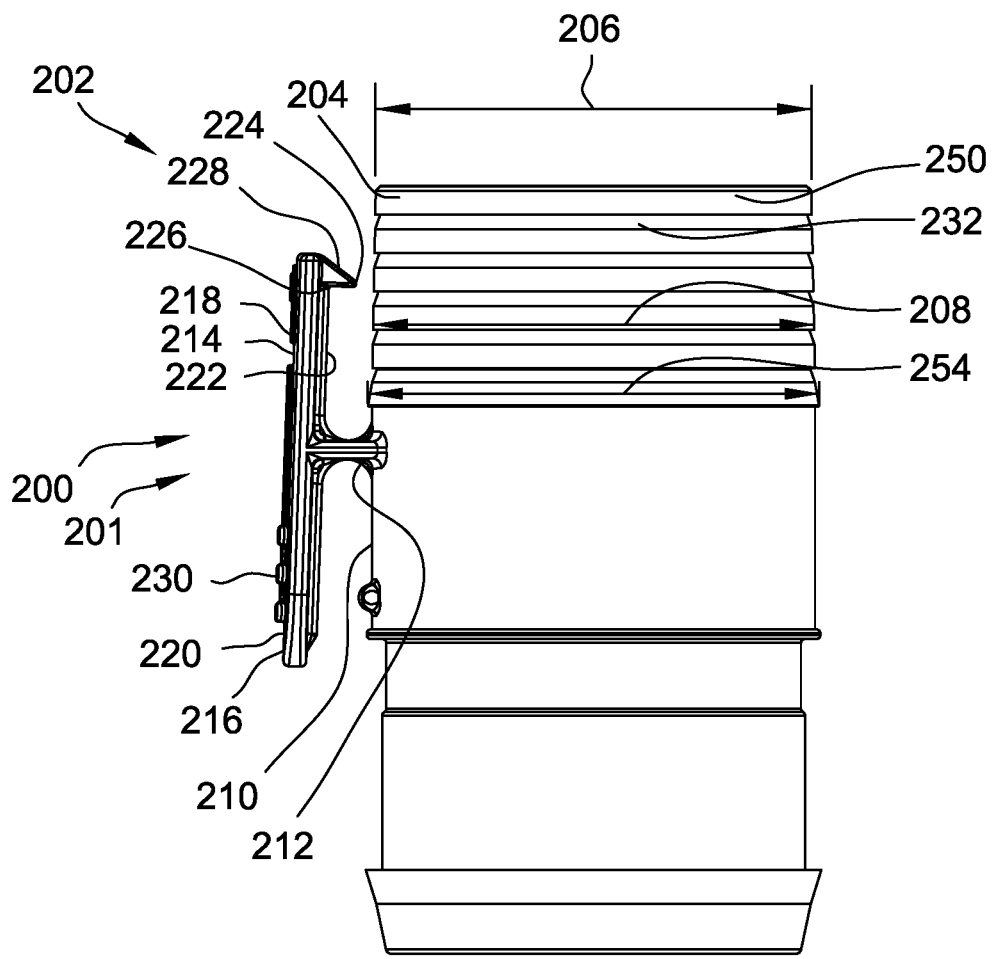
FIG. 3 is a side view of the hose adapter shown in FIG. 2.

FIG. 2 is a perspective view of a vacuum cleaner accessory in the form of a hose adapter 200 including a vacuum locking tab 201, also referred to as a first component of attachment mechanism 102. FIG. 3 is a side view of hose adapter 200 shown in FIG. 2. Although locking tab 201 is shown and described with reference to hose adapter 200, locking tab 201 may be implemented on portions of vacuum cleaning system 100 other than hose adapter 200. In some embodiments, for example, vacuum cleaner accessories, such as hose adapter 200 or surface cleaning tool 150, may attach to any of vacuum cleaner hose 130, vacuum tube assembly 140, or another vacuum cleaner accessory and, as such, vacuum locking tab 201 may be included on a distal or proximal end of vacuum cleaner hose 130, vacuum tube assembly 140, or another vacuum cleaner accessory. Additionally or alternatively, vacuum locking tab 201 may be implemented on a proximal or attachment end 302 of a vacuum tube 300 (shown in FIGS. 4-7).

As shown in FIGS. 2 and 3, a first end 202 of hose adapter 200 includes an inner attachment tube 204 for attachment with attachment end 302 of a vacuum cleaner accessory, such as vacuum tube 300 (shown in FIGS. 4-7). In the illustrated embodiment, first end 202 is shown as a distal end of hose adapter 200. However, first end 202 may also be a distal end or proximal end of another vacuum cleaner accessory, such as surface cleaning tool 150, vacuum cleaner hose 130, or vacuum tube assembly 140. Inner attachment tube 204 has a cylindrical shape that is tapered such that the diameter of inner attachment tube 204 increases from first end 202 toward vacuum locking tab 201. As such, inner attachment tube 204 includes a first outer diameter 206 proximate first end 202 that is smaller than a second outer diameter 208 (shown in FIG. 3) proximate vacuum locking tab 201.

Vacuum locking tab 201 is positioned on an outer surface 210 of inner attachment tube 204 and includes a pivot extension 212 extending radially outward from outer surface 210 of inner attachment tube 204. Vacuum locking tab 201 also includes a latch 214 that may be connected or pivotably attached to pivot extension 212. Latch 214 includes a finger engagement portion 216 extending from pivot extension 212 and a latching portion 218 extending from pivot extension 212 opposite finger engagement portion 216. Latch 214 includes a top surface 220 and a bottom surface 222. A latch tooth 224 extends from bottom surface 222 and includes a latching vertical portion 226 facing away from first end 202 and a sloping ratcheting portion 228 facing toward first end 202 to form a triangular shape. A plurality of ribs 230 extend from top surface 220 of finger engagement portion 216. Ribs 230 include an ergonomic design with a smooth, contoured outer surface to conform to the user's thumb, and facilitate use of finger engagement portion 216 as a tab to manipulate vacuum locking tab 201 and latch tooth 224.

Figure 4:
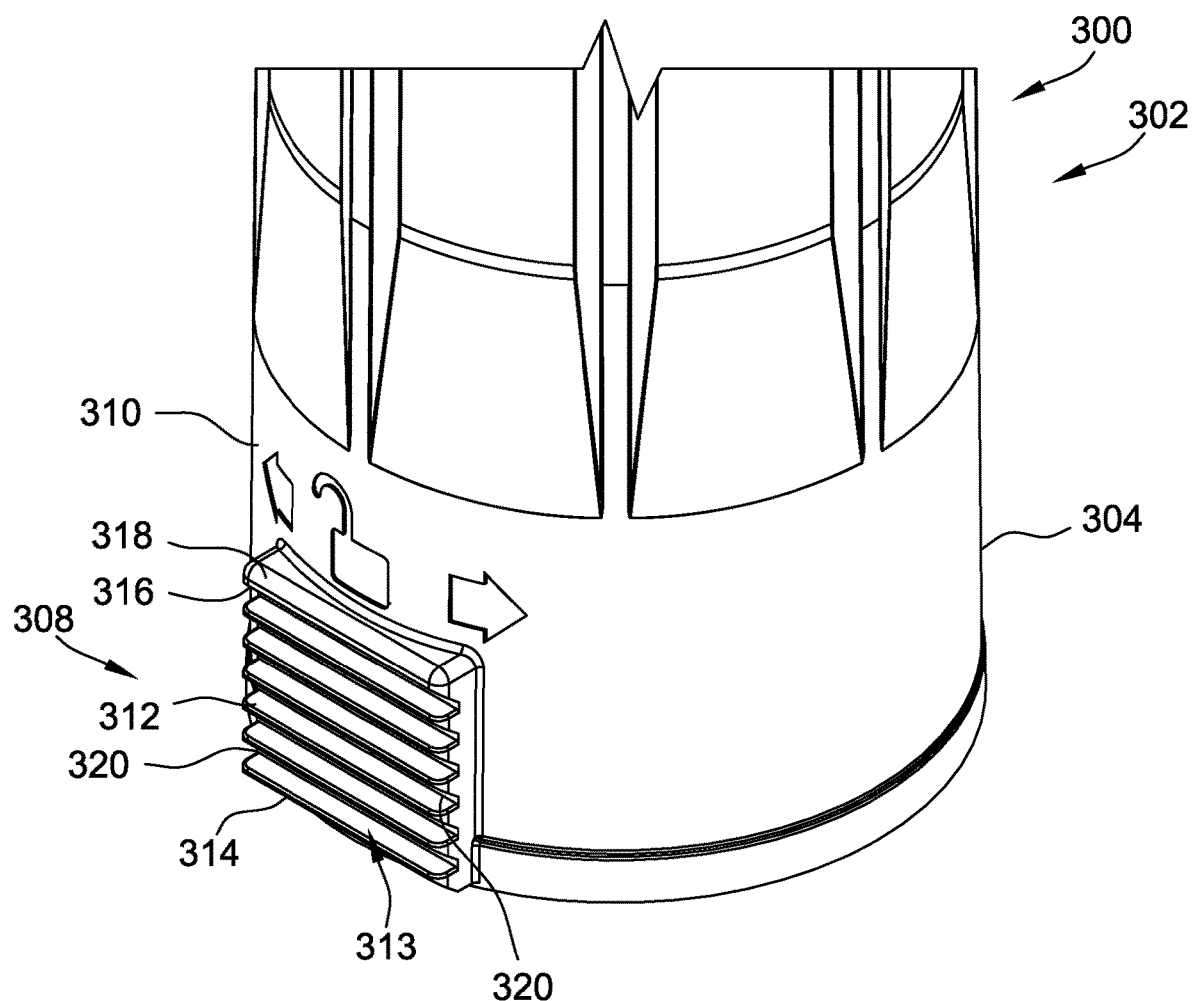
FIG. 4 is a perspective view of an attachment end of a vacuum tube, including a row of teeth positioned on an outer surface of the vacuum tube.
Figure 5:
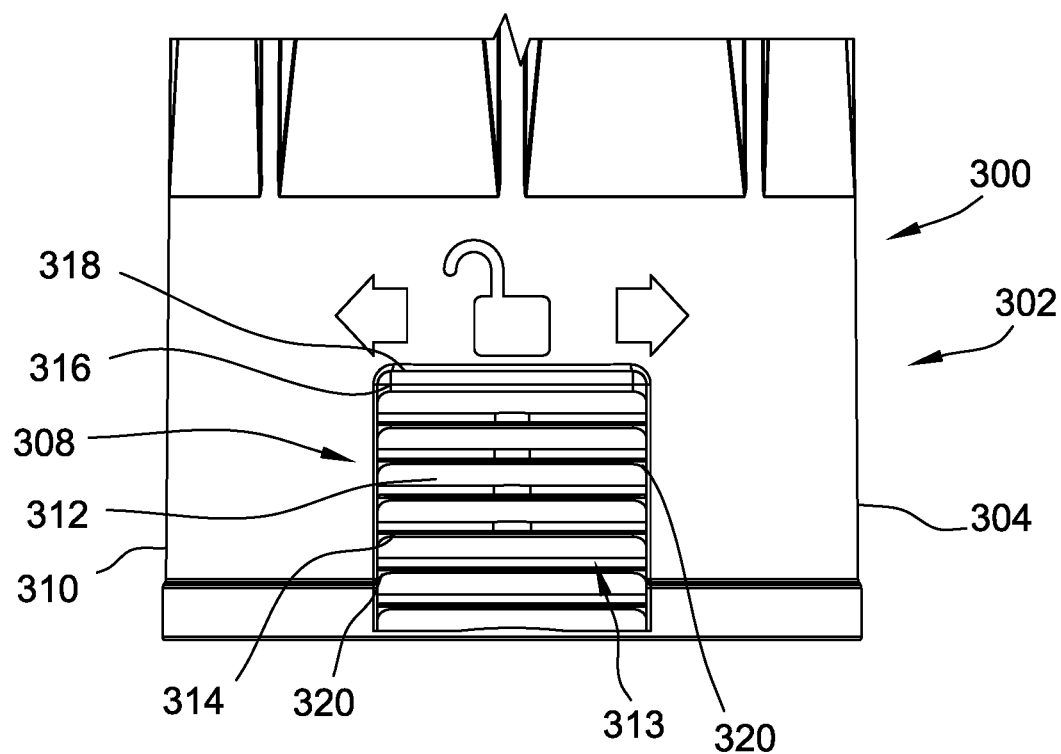
FIG. 5 is a top view of the attachment end of the vacuum tube shown in FIG. 4.
Figure 6:
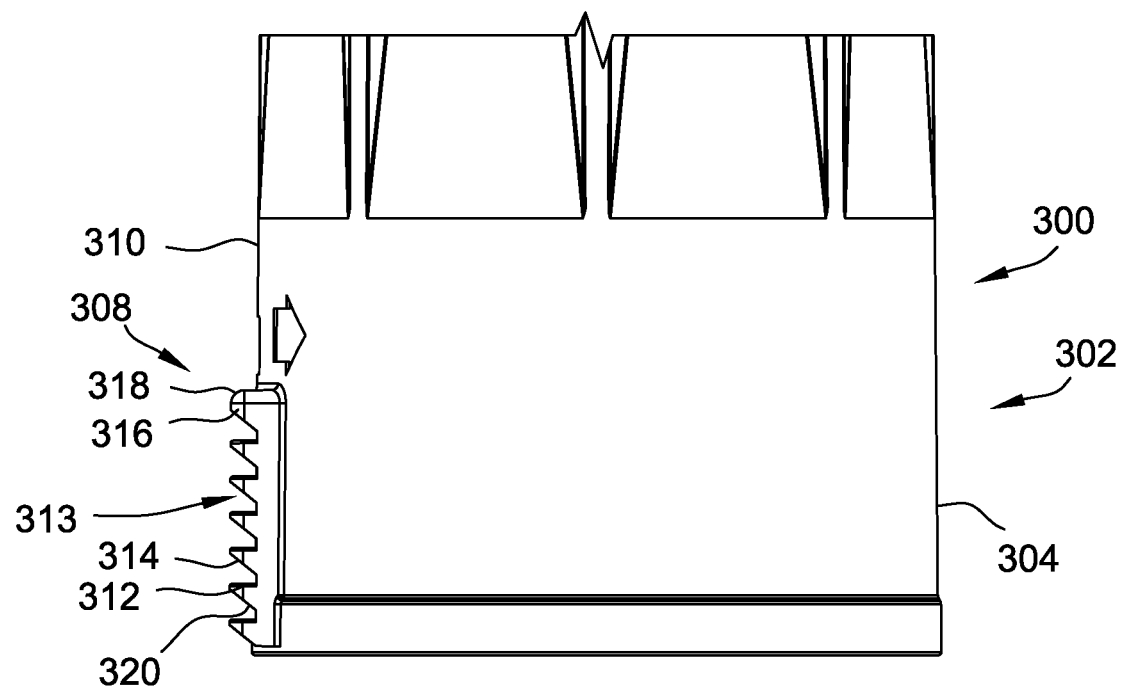
FIG. 6 is a side view of the attachment end of the vacuum tube shown in FIG. 4.
Figure 7:
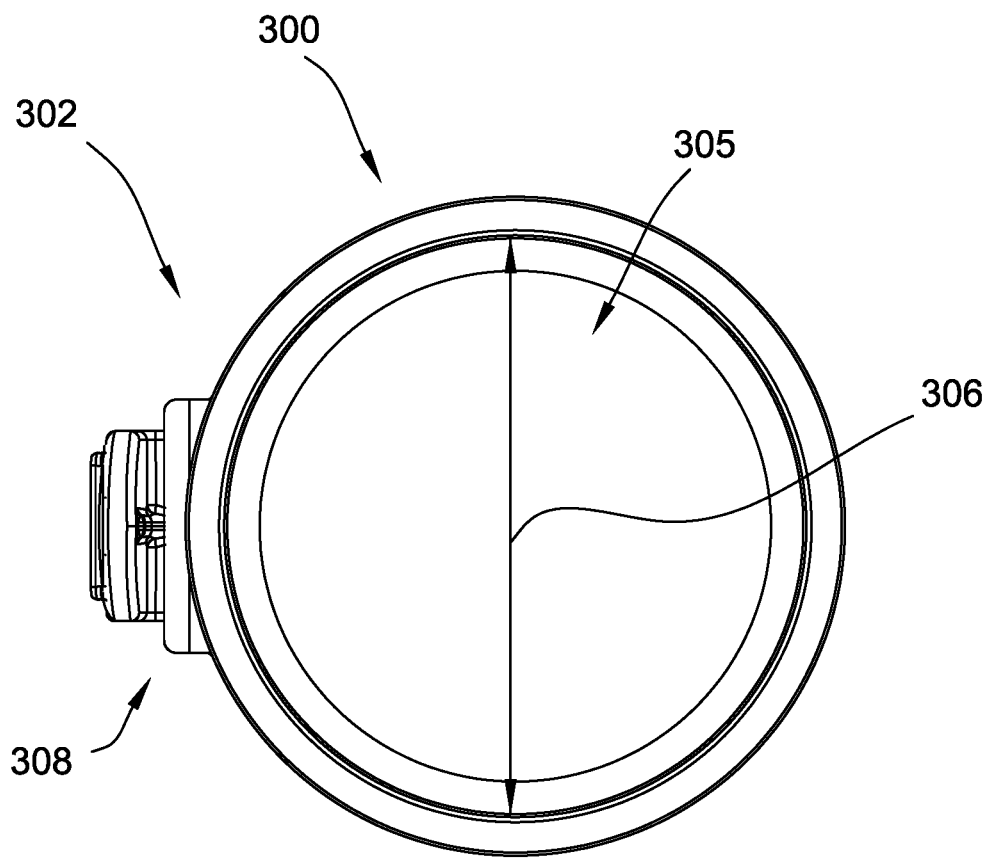
FIG. 7 is an end view of the attachment end of the vacuum tube shown in FIG. 4.

FIG. 4 is a perspective view of a proximal or attachment end 302 of a vacuum cleaner accessory in the form of vacuum tube 300. FIG. 5 is a top view of attachment end 302 of vacuum tube 300, FIG. 6 is a side view of attachment end 302 of vacuum tube 300, and FIG. 7 is an end view of attachment end 302 of vacuum tube 300. Vacuum tube assembly 140 may include at least one vacuum tube 300 to permit fluid communication between suction unit 110 and vacuum cleaner accessory, surface cleaning tool 150, vacuum cleaner hose 130, or another vacuum tube 300. As shown in FIGS. 4, 5, 6, and 7, attachment end 302 includes an outer attachment tube 304 for attachment with first end 202 of a vacuum cleaner accessory, such as hose adapter 200 (shown in FIGS. 2 and 3). Outer attachment tube 304 defines an opening 305 (shown in FIG. 7) sized and shaped to receive first end 202 of hose adapter 200 therein. More specifically, outer attachment tube 304 is cylindrical and has a first inner diameter 306 (shown in FIG. 7) that is larger than diameter 206.

A plurality of teeth 308, also referred to as a second component of attachment mechanism 102, are positioned on an outer surface 310 of outer attachment tube 304, and are arranged linearly or axially on outer surface 310 to form a row of sequential teeth. In the example embodiment, each tooth 308 of sequential teeth 308 has a triangular shape with a vertical back portion 312 facing away from attachment end 302 and a sloped front portion 314 facing toward attachment end 302. Sequential teeth 308 are arranged linearly such that sloped front portion 314 of a first tooth 308 faces vertical back portion 312 of a second tooth 308. A rearward-most tooth 316 includes a curved back portion 318. Each pair of adjacent teeth 308 of the plurality of teeth defines a groove 313 sized and shaped complementary to the locking tab tooth 224. In the illustrated embodiment, each groove 313 extends laterally or circumferentially to each of the lateral sides of the teeth 308 such that each groove 313 is open along the lateral sides of the row of teeth 308. As described in more detail herein, the open ends along the lateral sides of the row of teeth 308 facilitates connecting and disconnecting the vacuum locking tab 201 with the row of teeth 308 by rotating the vacuum locking tab 201 relative to the row of teeth 308.

First end 202 is configured to sealingly engage attachment end 302 to provide a sealed connection between inner attachment tube 204 and outer attachment tube 304. That is, outer attachment tube 304 is configured to slide over inner attachment tube 204. Because first inner diameter 306 is larger than first outer diameter 206, outer attachment tube 304 is capable of sliding over inner attachment tube 204 and forming a sealed connection. Vacuum locking tab 201 is configured to engage sequential teeth 308 as outer attachment tube 304 slides over inner attachment tube 204. More specifically, latch tooth 224 is configured to engage each individual tooth 308 of sequential teeth 308 in a ratcheting motion. That is, latch tooth 224 is configured to move up and down between each individual tooth 308 of sequential teeth 308. As latch tooth 224 moves down between each individual tooth 308 of sequential teeth 308, latching vertical portion 226 engages vertical back portion 312 to prevent latch tooth 224 and first end 202 from sliding in the opposite direction. Additionally, sloping ratcheting portion 228 engages sloped front portion 314 such that latch tooth 224 fits within groove 313 between each individual tooth 308 of sequential teeth 308. As latch tooth 224 ratchets through sequential teeth 308, latch 214 pivots about pivot extension 212 and provides a downward force that prevents latch tooth 224 from disengaging from sequential teeth 308. As outer attachment tube 304 slides further over inner attachment tube 204 to form a tighter seal, latch tooth 224 ratchets through more sequential teeth 308 to allow outer attachment tube 304 to be secured to inner attachment tube 204 at the furthest point of insertion. Outer attachment tube 304 continues to slide over inner attachment tube 204 until the friction fit between outer attachment tube 304 and inner attachment tube 204 prevents further insertion. Once outer attachment tube 304 is prevented from sliding further over inner attachment tube 204, vacuum locking tab 201 and sequential teeth 308 maintain the sealed connection between outer attachment tube 304 and inner attachment tube 204.

In order to change vacuum cleaner accessories, vacuum locking tab 201 is also configured to selectively disengage latch tooth 224 from sequential teeth 308. Specifically, to disengage latch tooth 224 from teeth 308, finger engagement portion 216 is depressed, causing latch 214 to pivot about pivot extension 212. As latch 214 pivots about pivot extension 212, latching portion 218 also pivots about pivot extension 212, causing latch tooth 224 to move in an upward direction, out of one of grooves 313, and disengage from sequential teeth 308. Once latch tooth 224 is disengaged from the plurality of teeth 308, outer attachment tube 304 can be pulled away and disconnected from inner attachment tube 204.

Vacuum locking tab 201 is also configured to selectively disengage latch tooth 224 from sequential teeth 308 by rotating inner attachment tube 204 (and the associated vacuum cleaner accessory) relative to outer attachment tube 304 (and the associated vacuum cleaner accessory). As previously discussed, sequential teeth 308 define open sides 320 that allow latch tooth 224 to rotate out of one of grooves 313 defined by sequential teeth 308 when outer attachment tube 304 is rotated relative to inner attachment tube 204. As such, latch tooth 224 can be disengaged from sequential teeth 308 by simply rotating outer attachment tube 304 relative to inner attachment tube 204. After latch tooth 224 has been disengaged from sequential teeth 308, the user may change the vacuum cleaner accessory by sliding outer attachment tube 304 away from inner attachment tube 204, and sliding a new vacuum cleaner accessory on to inner attachment tube 204.

In use, the surface cleaning tool 150 may also be attached to one of vacuum cleaner hose 130, vacuum tube assembly 140, or another vacuum cleaner accessory by attachment mechanism 102. For example, surface cleaning tool 150 may include locking tab 201, and can be attached by first aligning an attachment end of surface cleaning tool 150 with an attachment end of one of vacuum cleaner hose 130, vacuum tube assembly 140, or another vacuum cleaner accessory such that latch tooth 224 is aligned with sequential teeth 308. Outer attachment tube 304 is then slid over an inner attachment tube of the surface cleaning tool (e.g., inner attachment tube 204) until second outer diameter 208 is equal to first inner diameter 306, at which point a sealed connection will be established between outer attachment tube 304 and inner attachment tube 204. As outer attachment tube 304 slides over inner attachment tube 204, latch tooth 224 ratchets through sequential teeth 308 preventing outer attachment tube 304 from sliding away from inner attachment tube 204 and maintaining the sealed connection between outer attachment tube 304 and inner attachment tube 204.

To detach surface cleaning tool 150 from one of vacuum cleaner hose 130, vacuum tube assembly 140, or another vacuum cleaner accessory, finger engagement portion 216 is depressed such that latching portion 218 and latch tooth 224 pivot about pivot extension 212, causing latch tooth 224 to disengage sequential teeth 308. Outer attachment tube 304 can then be slid away from inner attachment tube 204 until surface cleaning tool 150 is detached from one of vacuum cleaner hose 130, vacuum tube assembly 140, or another vacuum cleaner accessory.

Surface cleaning tool 150 may also be detached from one of vacuum cleaner hose 130, vacuum tube assembly 140, or another vacuum cleaner accessory by rotating outer attachment tube 304 relative to inner attachment tube 204 such that latch tooth 224 rotates beyond open sides 320 and disengages latch tooth 224 from sequential teeth 308. Outer attachment tube 304 may then be slid away from inner attachment tube 204 until surface cleaning tool 150 is detached from one of vacuum cleaner hose 130, vacuum tube assembly 140, or another vacuum cleaner accessory.

Figure 8:
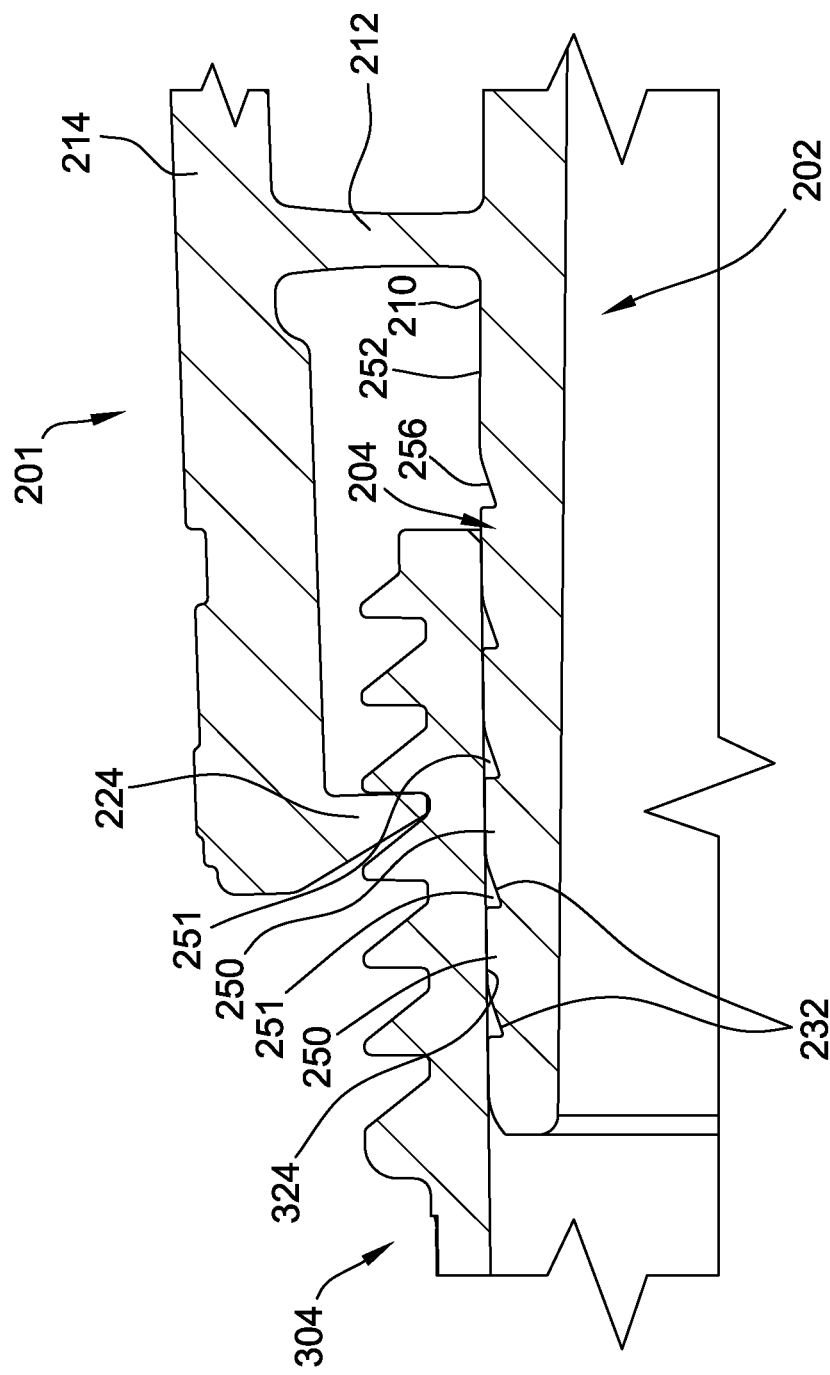
FIG. 8 is an enlarged sectional view of the hose adapter of FIG. 2 connected to the attachment end of the vacuum tube of FIG. 4.

In some embodiments, inner attachment tube 204 includes a plurality of circumferential grooves or depressions 232 (shown in FIGS. 2 and 3) that extend around a circumference of inner attachment tube 204. With additional reference to FIG. 8, grooves 232 are spaced axially from one another, and are defined along the tapered portion of first end 202. Grooves 232 are configured to reduce friction between outer surface 210 of inner attachment tube 204 and an inner surface 324 of outer attachment tube 304 to facilitate relative rotation between outer attachment tube 304 and inner attachment tube 204. Prior designs that did not include circumferential grooves 232 would allow contact between outer attachment tube 304 and inner attachment tube 204 along the entire length of outer surface 210, creating a relatively large amount of static friction that would need to be overcome to break the static lock between inner attachment tube 204 and outer attachment tube 304. Grooves 232 reduce the effective mating surface area between inner attachment tube 204 and outer attachment tube 304 as compared to prior designs, resulting in reduced static friction between inner attachment tube 204 and outer attachment tube 304. Thus, circumferential grooves 232 make it easier to rotate inner attachment tube 204 and outer attachment tube 304 relative to one another, and remove one part from the other.

In the illustrated embodiment, grooves 232 are defined by a plurality of circumferential rings 250 and a plurality of recessed, tapered surfaces 251. More specifically, each groove 232 is defined by one of circumferential rings 250 and one of recessed, tapered surfaces 251. A proximal-most ring 252 of rings 250 has a diameter 254 (FIG. 3) sized to prevent insertion of outer attachment tube 304 beyond the proximal-most ring 252. Specifically, diameter 254 is larger than first inner diameter 306 and prevents outer attachment tube 304 from sliding over inner attachment tube 204 beyond proximal-most ring 252. The increased diameter of proximal-most ring 252 inhibits over insertion of outer attachment tube 304, and prevents outer attachment tube 304 from impacting vacuum locking tab 201 (specifically, pivot extension 212). Additionally or alternatively, the taper angle of the proximal-most tapered surface 256 may be greater than the taper angle of the other tapered surfaces 251.

Figure 9:
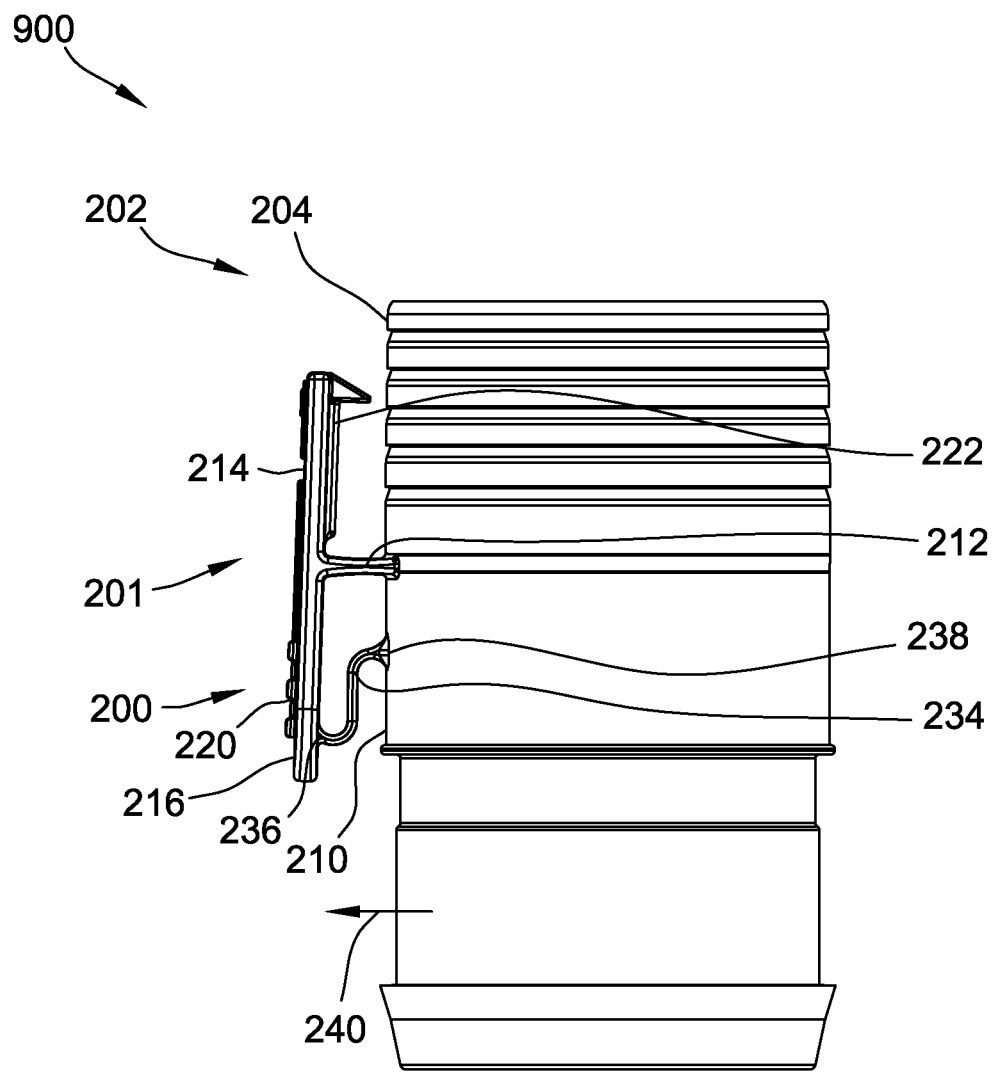
FIG. 9 is a side view of another hose adapter including a locking tab including a spring.

In some embodiments, vacuum locking tab 201 may also include one or more springs. FIG. 9, for example, illustrates a hose adapter 900 with vacuum locking tab 201 that includes a spring 234 that biases latch 214 towards a latched position (shown in FIG. 9). In the example embodiment, spring 234 is a formed plastic S-shaped spring having a first end 236 and a second end 238. First end 236 is connected to bottom surface 222 of latch 214, and second end 238 is connected to outer surface 210 of outer attachment tube 204. Spring 234 is free of sharp corners, turns, and joints, and facilitates distributing stress across spring 234 more evenly than springs that include sharp corners or turns. As noted above, spring 234 biases latch 214 towards a latching position or predetermined pivot point. The predetermined pivot point is set to ensure that latch tooth 224 extends low enough to engage teeth 308 when inner attachment tube 204 is inserted into outer attachment tube 304. The biasing force of spring 234 ensures that latch tooth 224 properly engages teeth 308, and facilitates maintaining latch tooth 224 within one of grooves 313 defined between adjacent teeth 308. In other embodiments, spring 234 may be any suitable spring that enables vacuum locking tab 201 to function as described herein. The use of one or more spring with vacuum locking tab 201 facilitates establishing a positive lock between vacuum locking tab 201 and teeth 308 over the functional life of the vacuum cleaner accessory. Locking tabs without a spring may permanently deflect or deform over the course of use, and lose the ability lock with teeth 308.

In the example embodiment, spring 234 and vacuum locking tab 201 are formed of a single molded part. Additionally, in the example embodiment, spring 234, vacuum locking tab 201, and hose adapter 200 are also formed of a single molded part. Forming spring 234, vacuum locking tab 201, and hose adapter 200 prevents spring 234 from becoming separated from vacuum locking tab 201 and hose adapter 200. In other embodiments, spring 234 may be formed separately from vacuum locking tab 201 and hose adapter 200.

In some embodiments, the predetermined pivot point established by spring 234 is set such that vacuum cleaner accessories that do not include sequential teeth 308 can still slide onto inner attachment tube 204 without interference from latch tooth 224. As such, vacuum locking tab 201 is configured to allow vacuum cleaner accessories that do not include sequential teeth 308 to slide onto inner attachment tube 204 for use with vacuum cleaning system 100.

Figure 11:
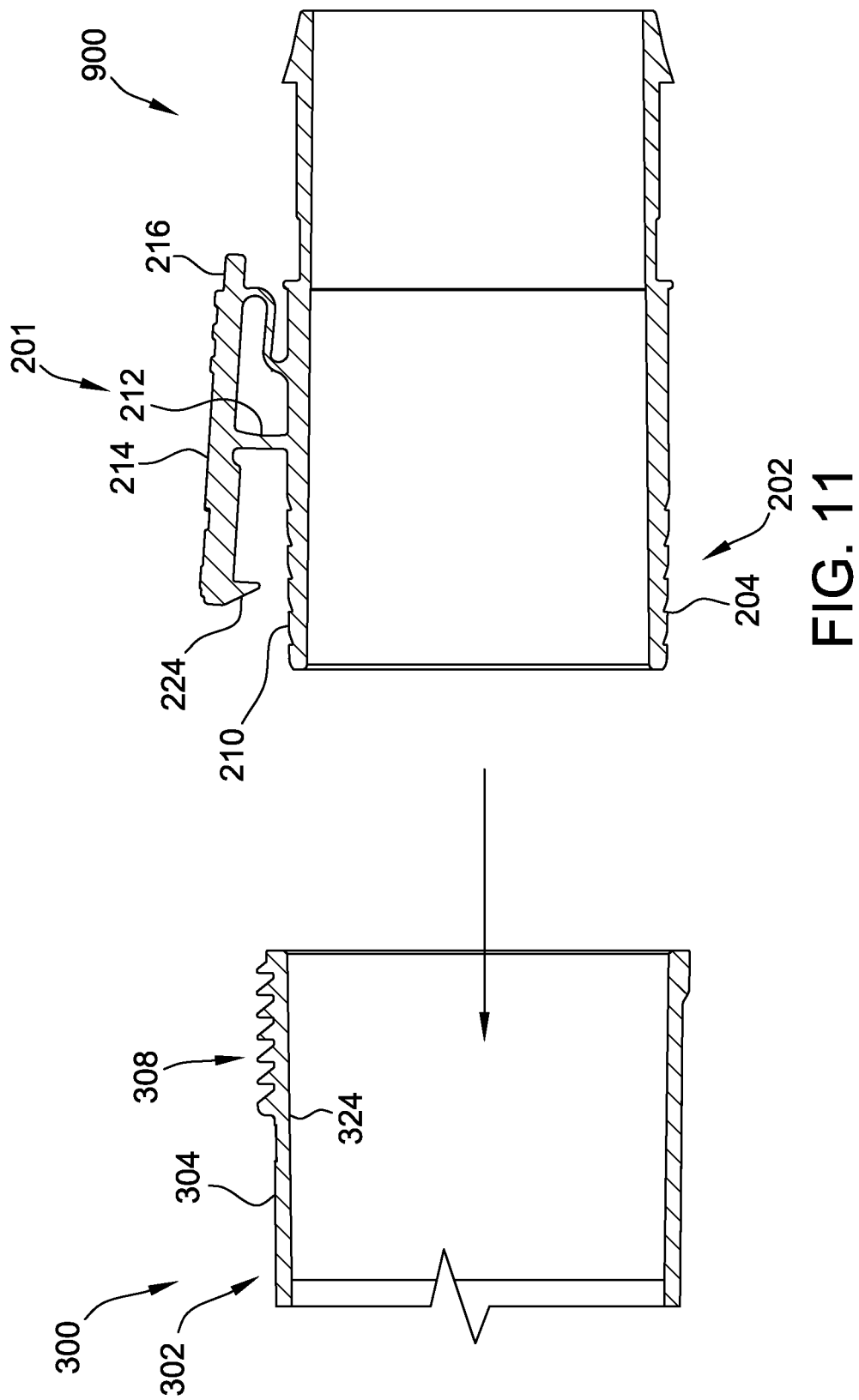
FIG. 11 is a sectional view of the hose adapter of FIG. 2 and the vacuum tube of FIG. 4 during a second stage of the example method of connecting the hose adapter to the vacuum tube.
Figure 12:
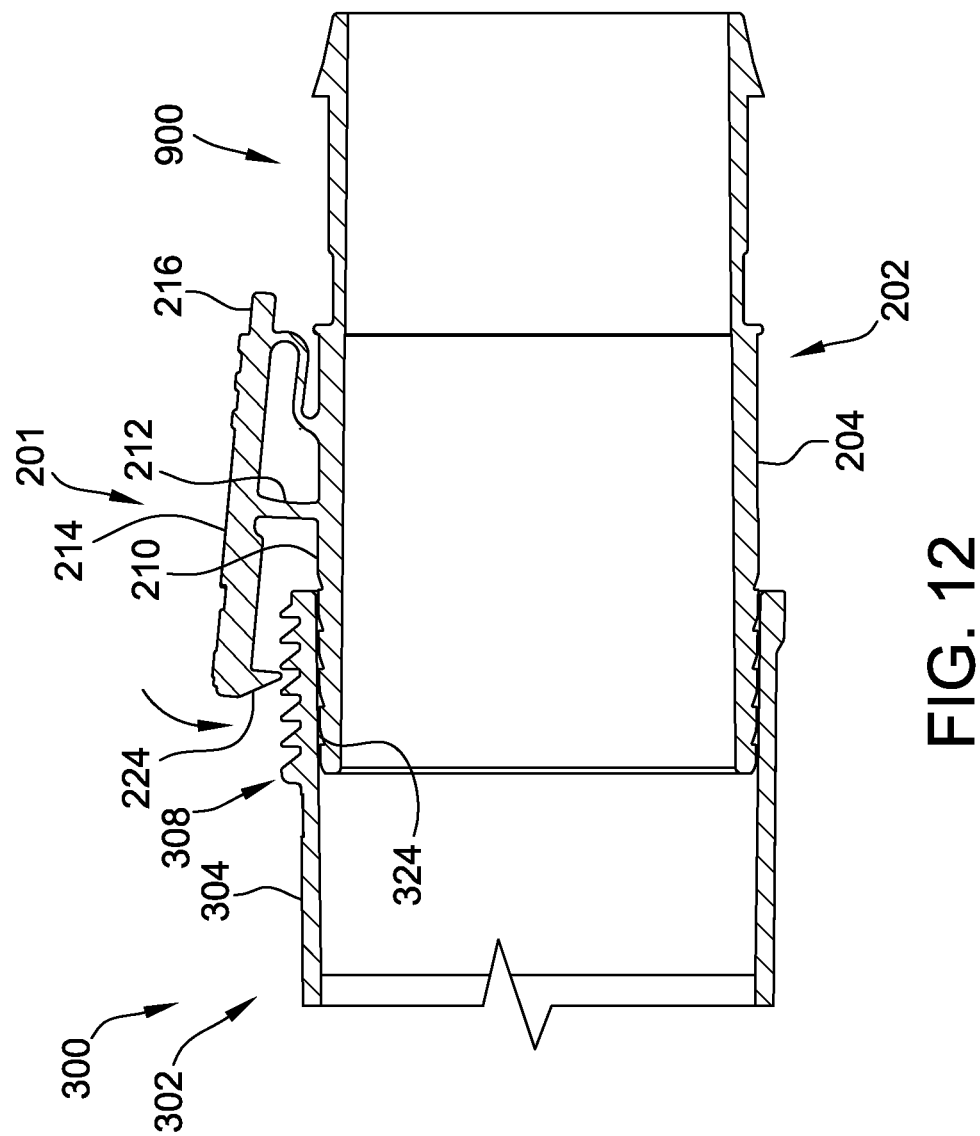
FIG. 12 is a sectional view of the hose adapter of FIG. 2 and the vacuum tube of FIG. 4 during a third stage of the example method of connecting the hose adapter to the vacuum tube.
Figure 13:
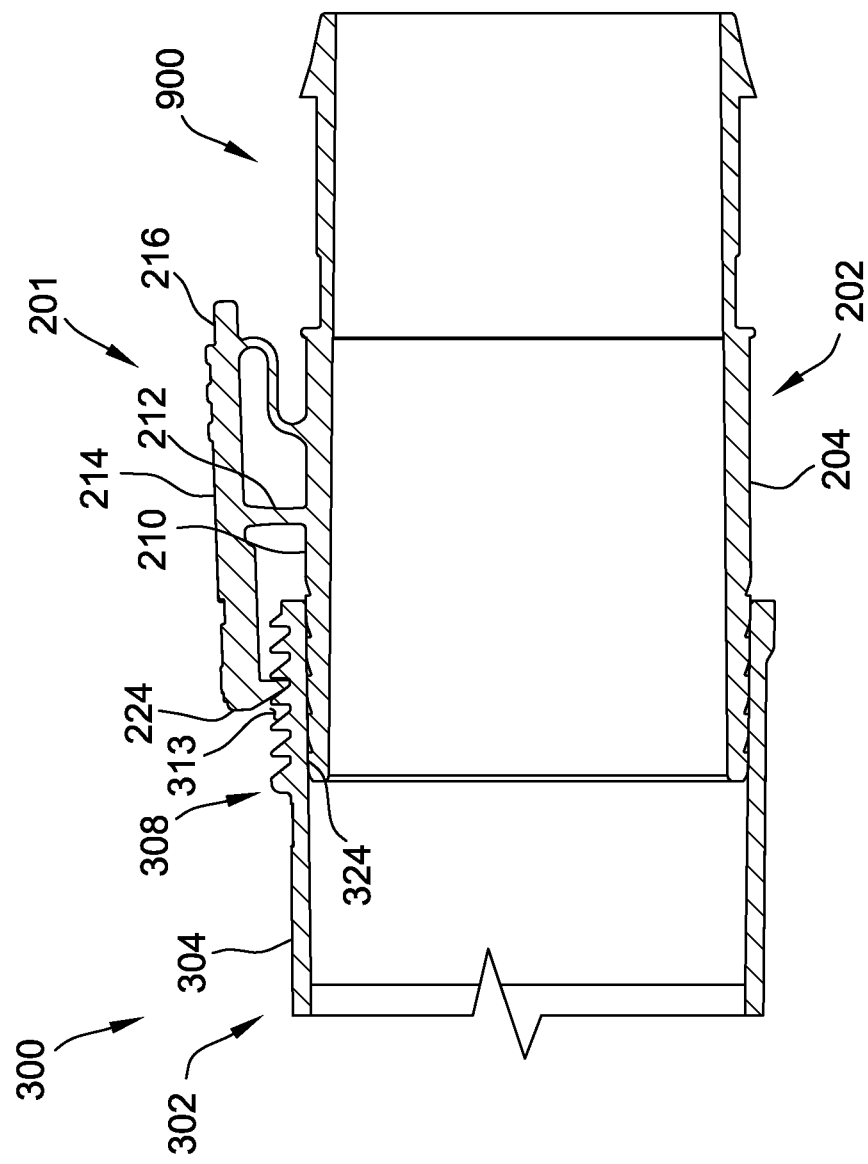
FIG. 13 is a sectional view of the hose adapter of FIG. 2 and the vacuum tube of FIG. 4 during a fourth stage of the example method of connecting the hose adapter to the vacuum tube.

FIGS. 10-18 show the hose adapter 900 of FIG. 9 during various stages of connecting and disconnecting hose adapter 900 to a vacuum cleaner accessory including sequential teeth 308, such as vacuum tube 300. In some embodiments, to connect hose adapter 900 to vacuum cleaner accessory 300, finger engagement portion 216 is depressed, causing latch 214 to pivot about pivot extension 212, and latch tooth 224 to move in an upward direction, as shown in FIGS. 10-11. With latch tooth 224 in the raised position (shown in FIGS. 11-12), inner attachment tube 204 of hose adapter 900 is inserted into outer attachment tube 304 of vacuum tube 300 until outer surface 210 of inner attachment tube 204 sealingly engages inner surface 324 of outer attachment tube 304. Finger engagement portion 216 is then released, allowing latch 214 to pivot about pivot extension 212 to the latched position (shown in FIG. 13), and latch tooth 224 to be inserted into one of grooves 313 defined by adjacent teeth 308. In other embodiments, inner attachment tube 204 may be inserted into outer attachment tube 304 with latch 214 in a lowered or latched position (shown in FIG. 9) such that latch tooth 224 ratchets through sequential teeth 308, as described herein.

Figure 14:
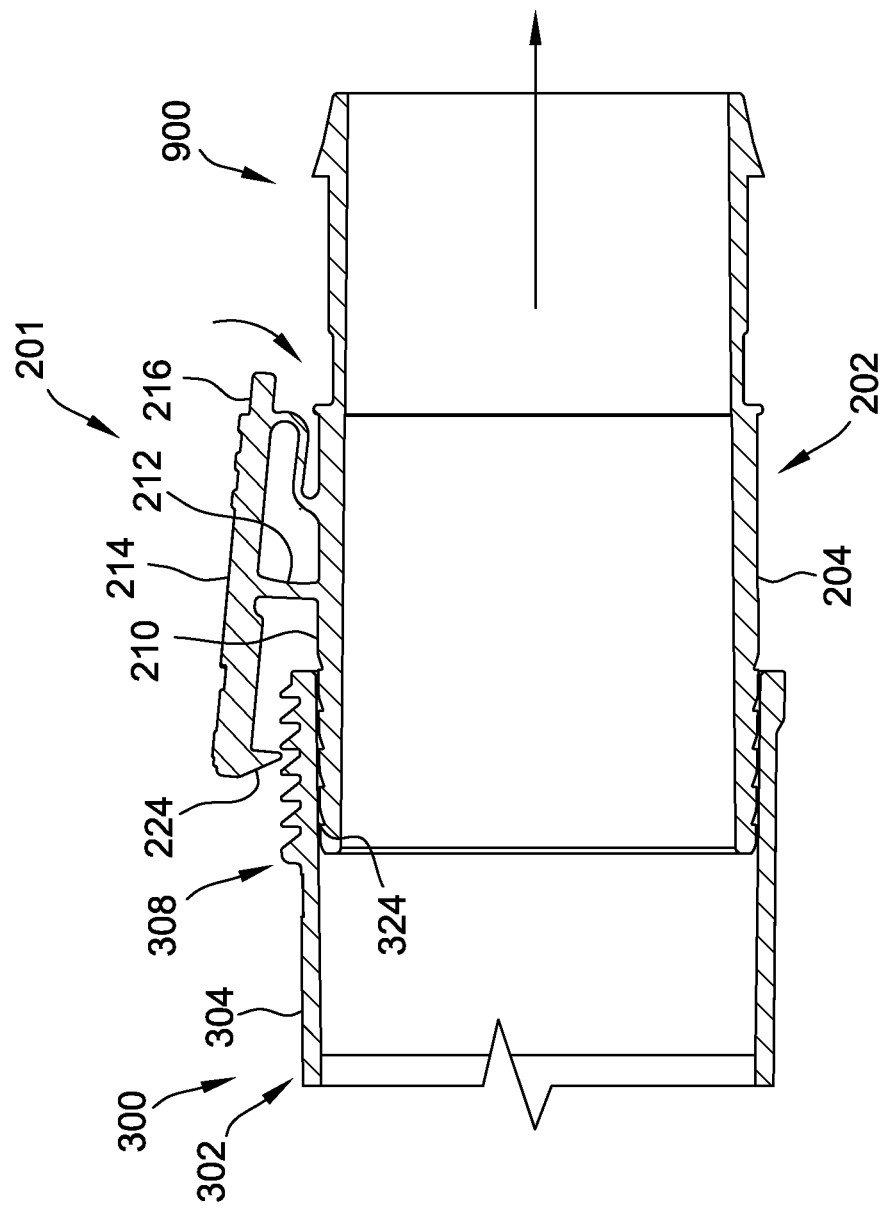
FIG. 14 is a sectional view of the hose adapter of FIG. 2 and the vacuum tube of FIG. 4 during a first stage of an example method of disconnecting the hose adapter from the vacuum tube.

In some embodiments, to disconnect hose adapter 900 from vacuum tube 300, finger engagement portion 216 is depressed, causing latch 214 to pivot about pivot extension 212 and latch tooth 224 to disengage from teeth 308, as shown in FIG. 14. Once latch tooth 224 is disengaged from the plurality of teeth 308, outer attachment tube 304 is pulled away and disconnected from inner attachment tube 204, as shown in FIG. 15.

Figure 16:
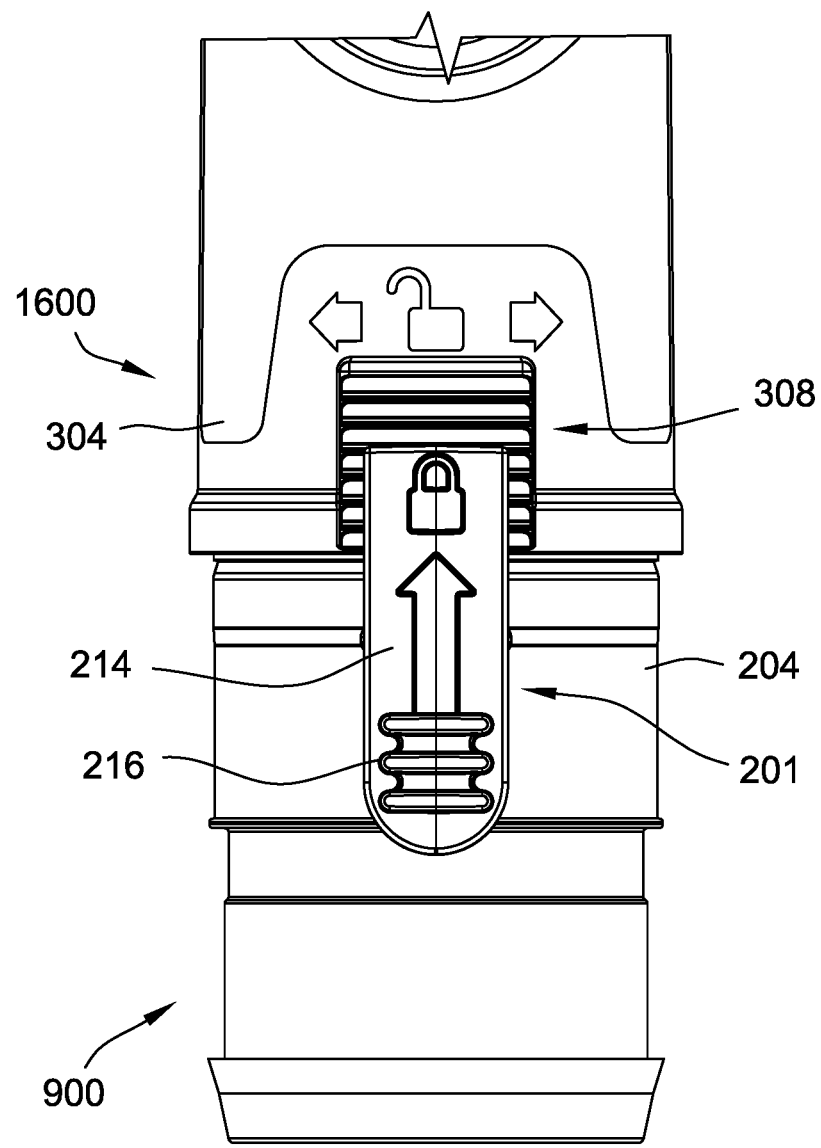
FIG. 16 is a top view of the hose adapter of FIG. 2 and a vacuum cleaner accessory during a first stage of a second example method of disconnecting the hose adapter from the vacuum cleaner accessory.
Figure 17:
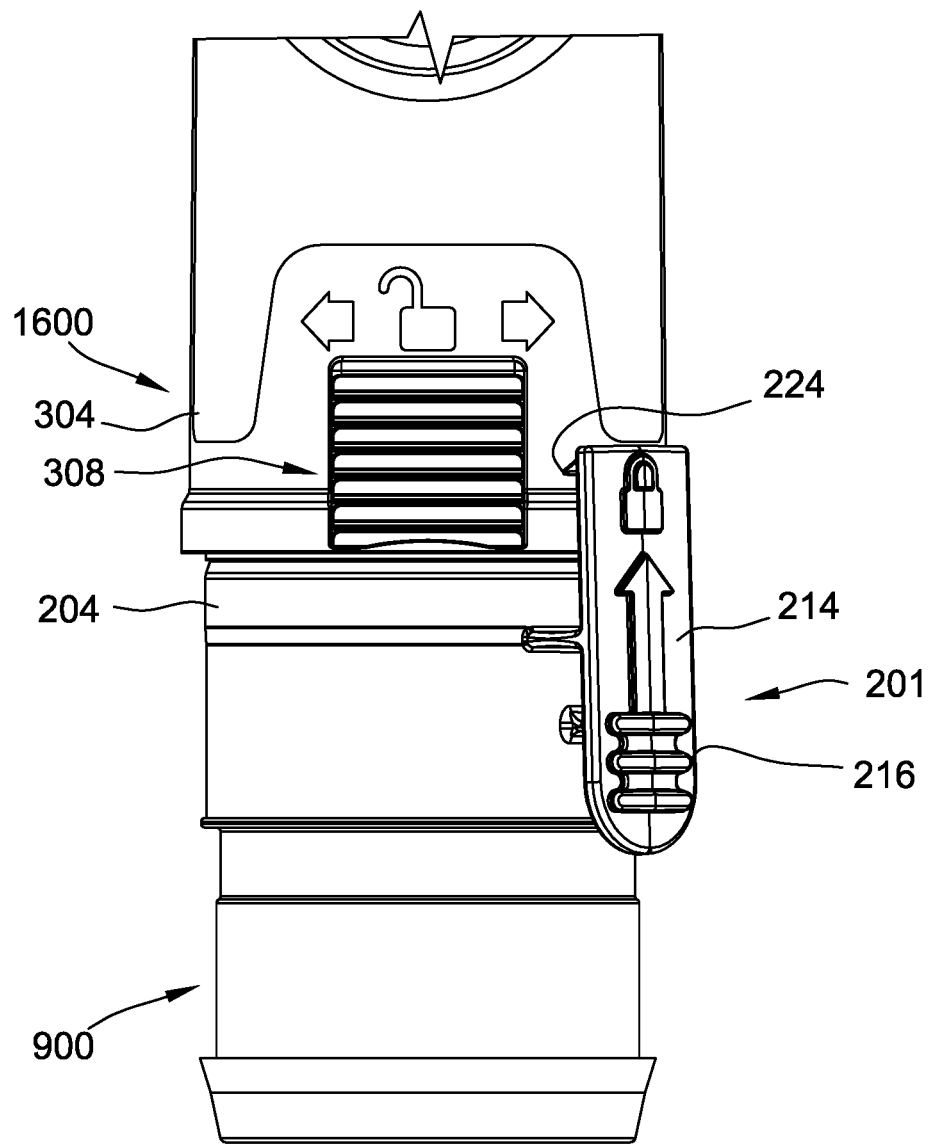
FIG. 17 is a top view of the hose adapter of FIG. 2 and the vacuum cleaner accessory of FIG. 16 during a second stage of the second example method of disconnecting the hose adapter from the vacuum cleaner accessory.
Figure 18:
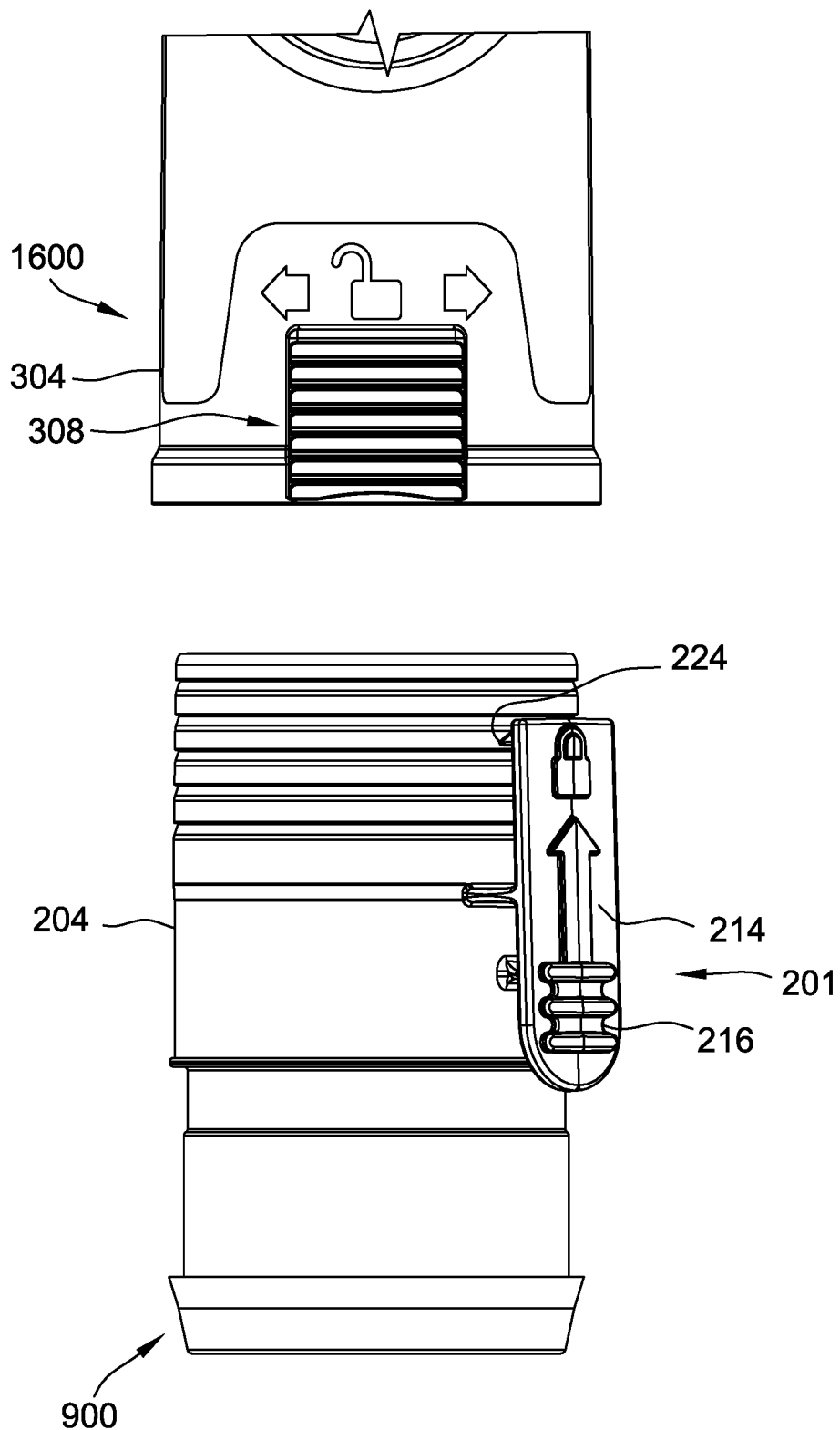
FIG. 18 is a top view of the hose adapter of FIG. 2 and the vacuum cleaner accessory of FIG. 16 during a third stage of the second example method of disconnecting the hose adapter from the vacuum cleaner accessory.

In other embodiments, hose adapter 900 may be disconnected from vacuum cleaner accessories by rotating inner attachment tube 204 relative to outer attachment tube 304 from the associated vacuum cleaner accessory. As shown in FIGS. 16-18, for example, hose adapter 900 can be disconnected from a vacuum cleaner accessory 1600 including outer attachment tube 304 and plurality of sequential teeth 308 by rotating inner attachment tube 204 relative to outer attachment tube 304. Rotation of inner attachment tube 204 causes latch tooth 224 (shown in FIG. 17) to rotate out of one grooves 313 through one of open sides 320 (shown in FIG. 6), thereby releasing latch tooth 224 from engagement with teeth 308, as shown in FIG. 17. Once latch tooth 224 is disengaged from teeth 308, outer attachment tube 304 is pulled away and disconnected from inner attachment tube 204, as shown in FIG. 18.

Ratcheting latch tooth 224 through teeth 308 creates a tighter seal between outer attachment tube 304 and inner attachment tube 204 and provides multiple attachment points at varying inner attachment tube 204 insertion depths. Each tooth 308 that latch tooth 224 ratchets through inserts inner attachment tube 204 deeper into outer attachment tube 304, creating a seal. Manufacturing tolerances in the manufacture of vacuum cleaner accessories causes some outer attachment tubes 304 and inner attachment tubes 204 to have inconsistent dimensions and, as such, not all outer attachment tubes 304 and inner attachment tubes 204 fit together to form a tight seal at the same insertion depth. As latch tooth 224 ratchets through row of teeth 308, the seal between inner attachment tube 204 and outer attachment tube 304 increases until the proper insertion depth is achieved to form a tight seal. Thus, ratcheting latch tooth 224 through teeth 308 provides multiple attachment points at varying inner attachment tube 204 insertion depths to create a tight seal between inner attachment tube 204 and outer attachment tube 304 irrespective of manufacturing tolerances.

Figure 19:
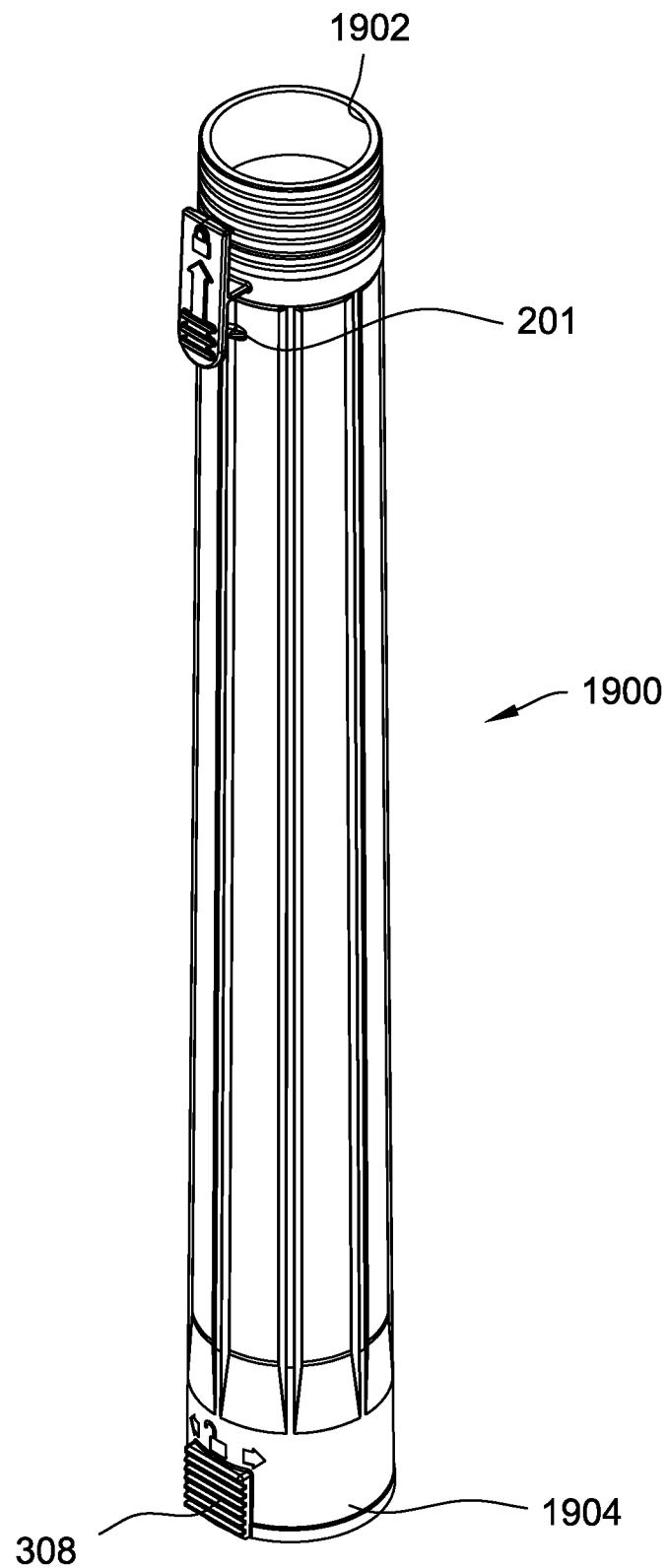
FIG. 19 is a perspective view of an example tube extension including the vacuum locking tab shown in FIG. 2 and the row of teeth shown in FIG. 4.

FIGS. 19-25 are perspective views of other embodiments of vacuum cleaner accessories that include vacuum locking tab 201 and/or sequential teeth 308. FIG. 19 is a perspective view of a vacuum cleaner accessory, shown in the form of a vacuum tube extension 1900 that includes a first end 1902 and a second end 1904. First end 1902 includes vacuum locking tab 201 and second end 1904 includes sequential teeth 308. First end 1902 is configured to engage or mate with an outer attachment tube of a vacuum cleaner hose, a vacuum tube assembly, or a vacuum cleaner accessory (e.g., attachment end 302 of vacuum tube 300), while second end 1904 is configured to engage or mate with an inner attachment tube of a vacuum cleaner hose, a vacuum tube assembly, or another vacuum cleaner accessory (e.g., inner attachment tube 204 of hose adapter 200).

Figure 20:
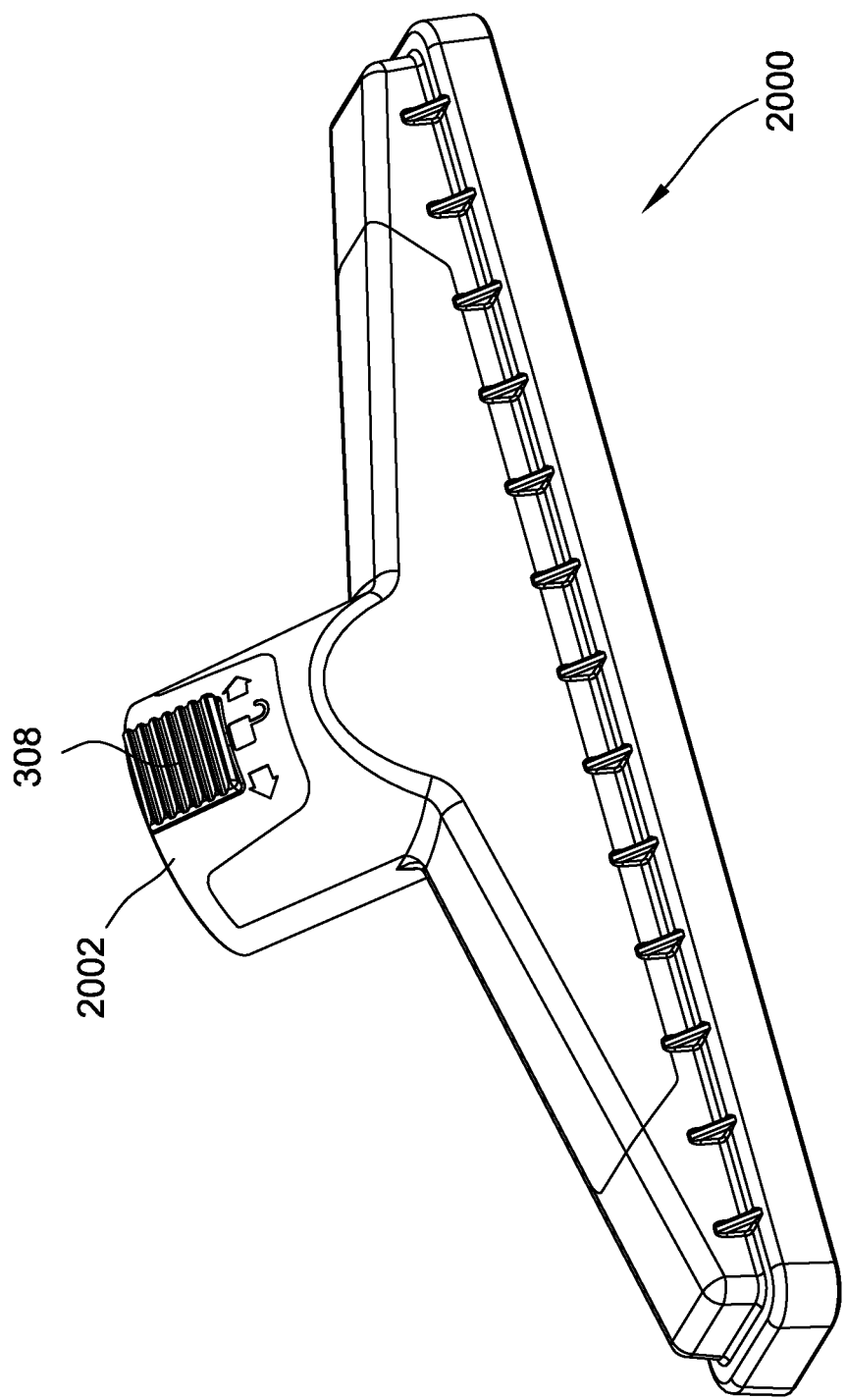
FIG. 20 is a perspective view of an example floor brush including the row of teeth shown in FIG. 4.

FIG. 20 is a perspective view of another embodiment of a vacuum cleaner accessory in the form of a floor brush 2000. Floor brush 2000 includes an attachment end 2002 that includes sequential teeth 308. Attachment end 2002 is configured to engage with an inner attachment tube of a vacuum cleaner hose, a vacuum tube assembly, or another vacuum cleaner accessory (e.g., inner attachment tube 204 of hose adapter 200).

Figure 21:
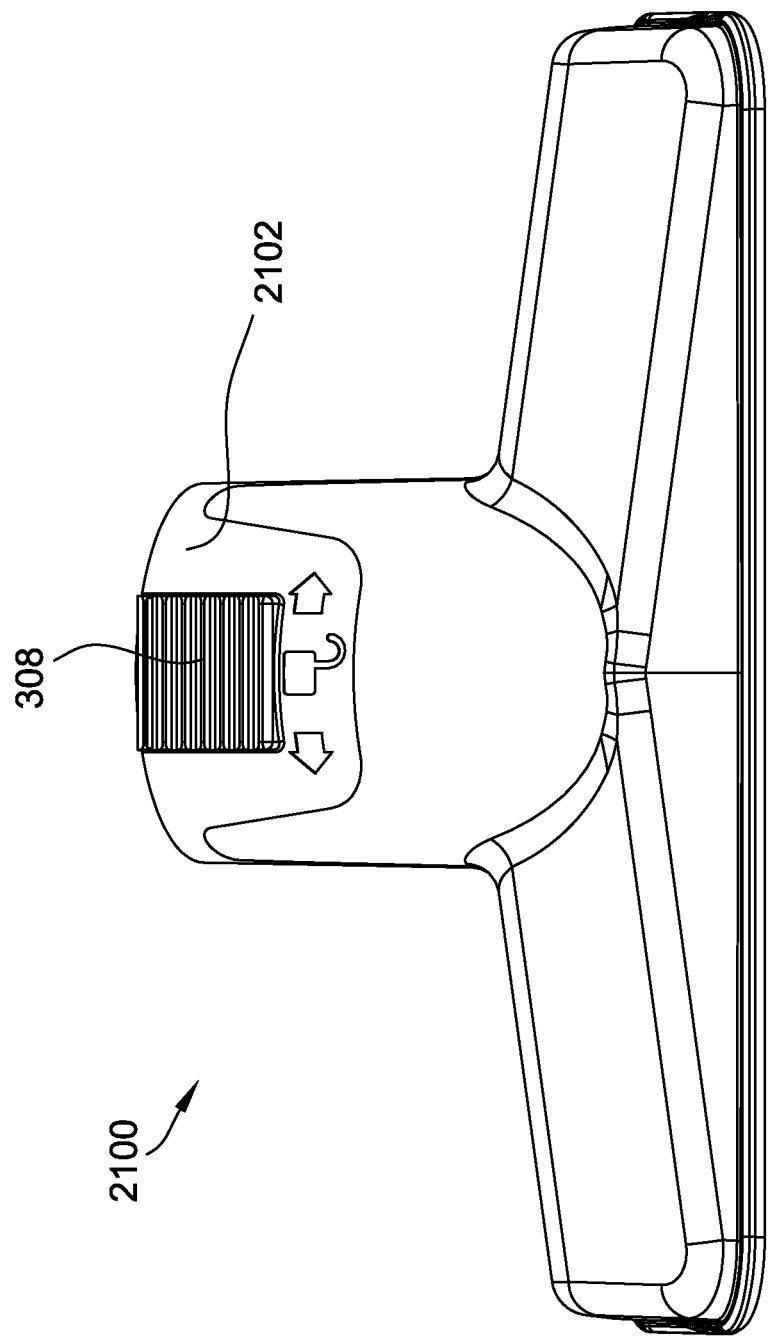
FIG. 21 is a perspective view of an example utility vacuum tool including the row of teeth shown in FIG. 4.

FIG. 21 is a perspective view of vacuum cleaner accessory in the form of a utility tool 2100. Utility tool 2100 includes an attachment end 2102 that includes sequential teeth 308. Attachment end 2102 is configured to engage with an inner attachment tube of a vacuum cleaner hose, a vacuum tube assembly, or another vacuum cleaner accessory (e.g., inner attachment tube 204 of hose adapter 200).

Figure 22:
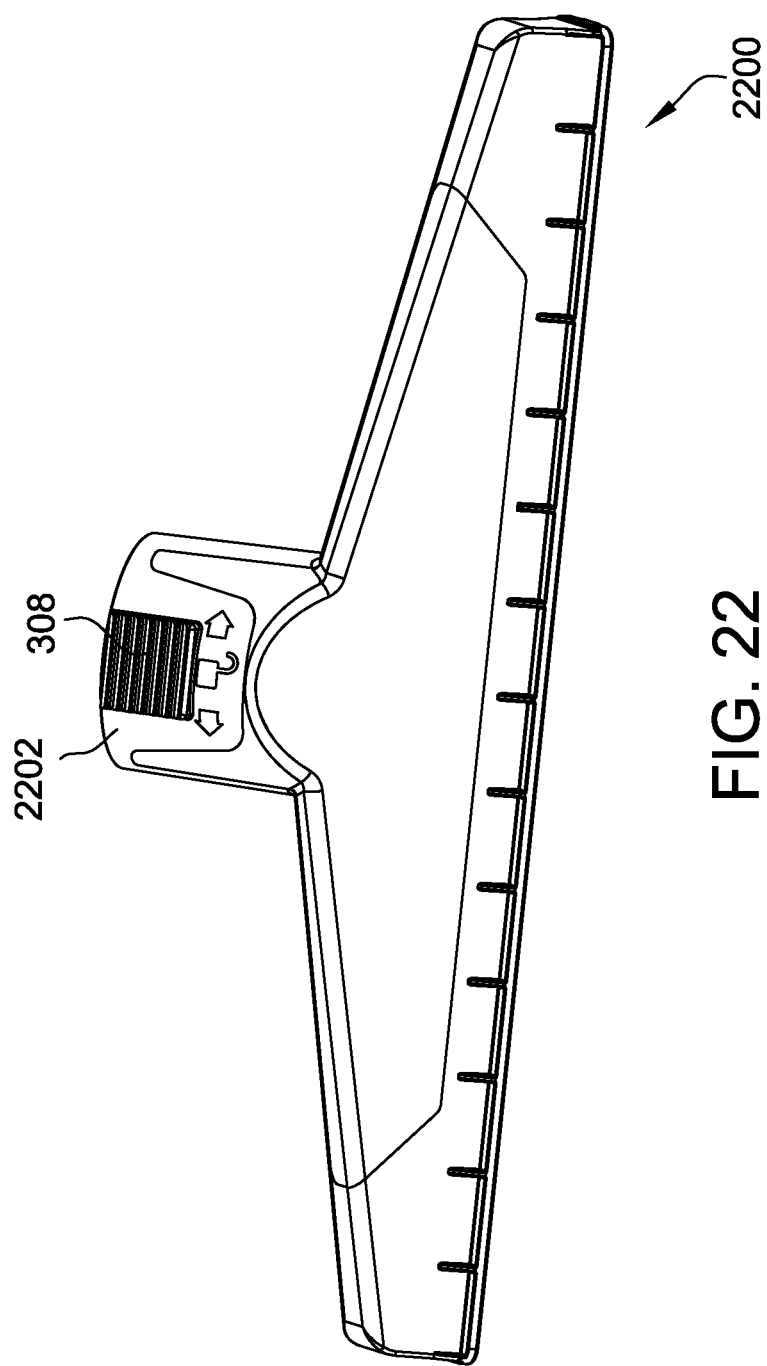
FIG. 22 is a perspective view of an example wet tool including the row of teeth shown in FIG. 4.

FIG. 22 is a perspective view of vacuum cleaner accessory in the form of a wet tool 2200. Wet tool 2200 includes an attachment end 2202 that includes sequential teeth 308. Attachment end 2202 is configured to engage with an inner attachment tube of a vacuum cleaner hose, a vacuum tube assembly, or another vacuum cleaner accessory (e.g., inner attachment tube 204 of hose adapter 200).

Figure 23:
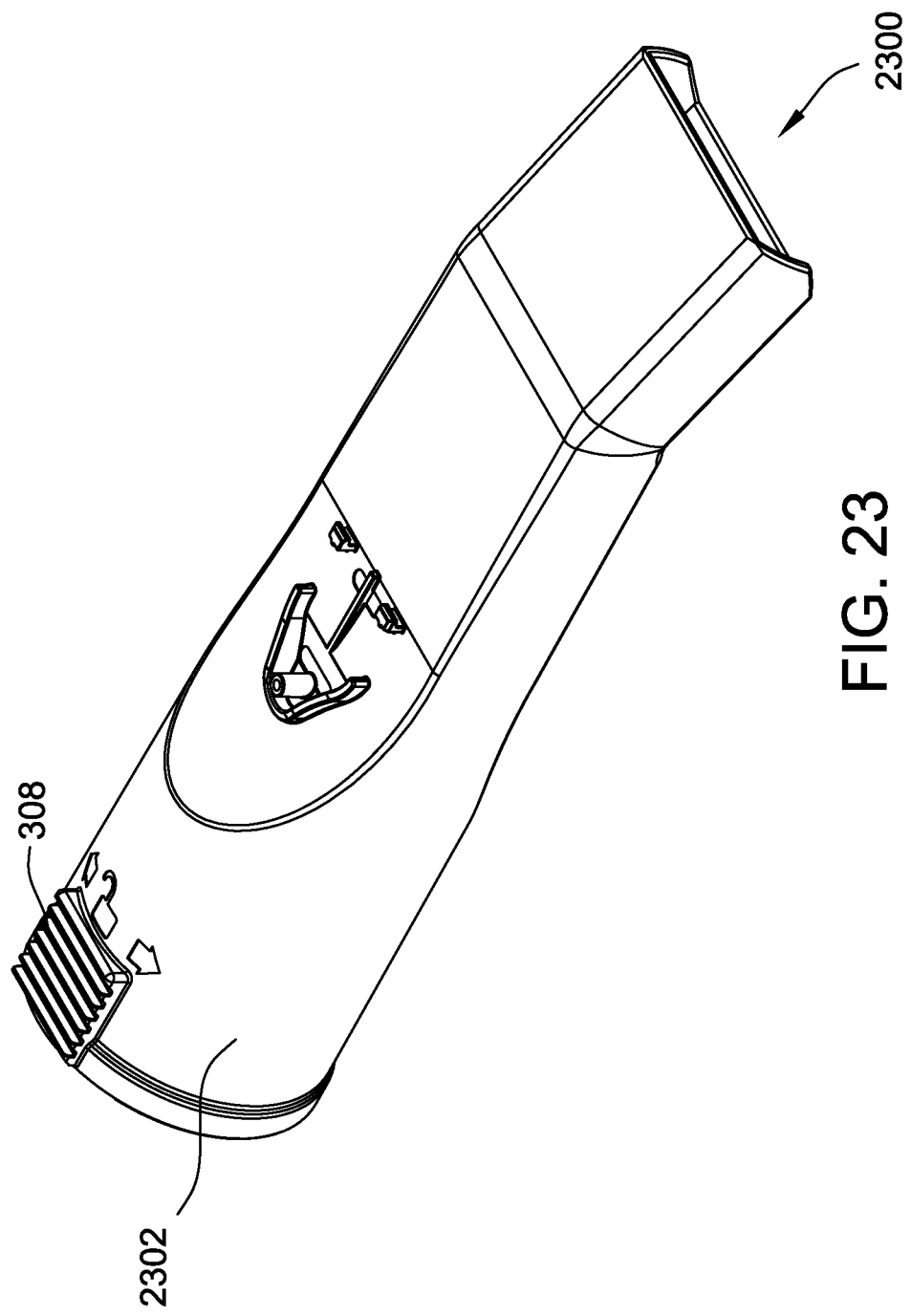
FIG. 23 is a perspective view of an example car tool including the row of teeth shown in FIG. 4.

FIG. 23 is a perspective view of vacuum cleaner accessory in the form of car tool 2300. Car tool 2300 includes an attachment end 2302 that includes sequential teeth 308. Attachment end 2302 is configured to engage with an inner attachment tube of a vacuum cleaner hose, a vacuum tube assembly, or another vacuum cleaner accessory (e.g., inner attachment tube 204 of hose adapter 200).

Figure 24:
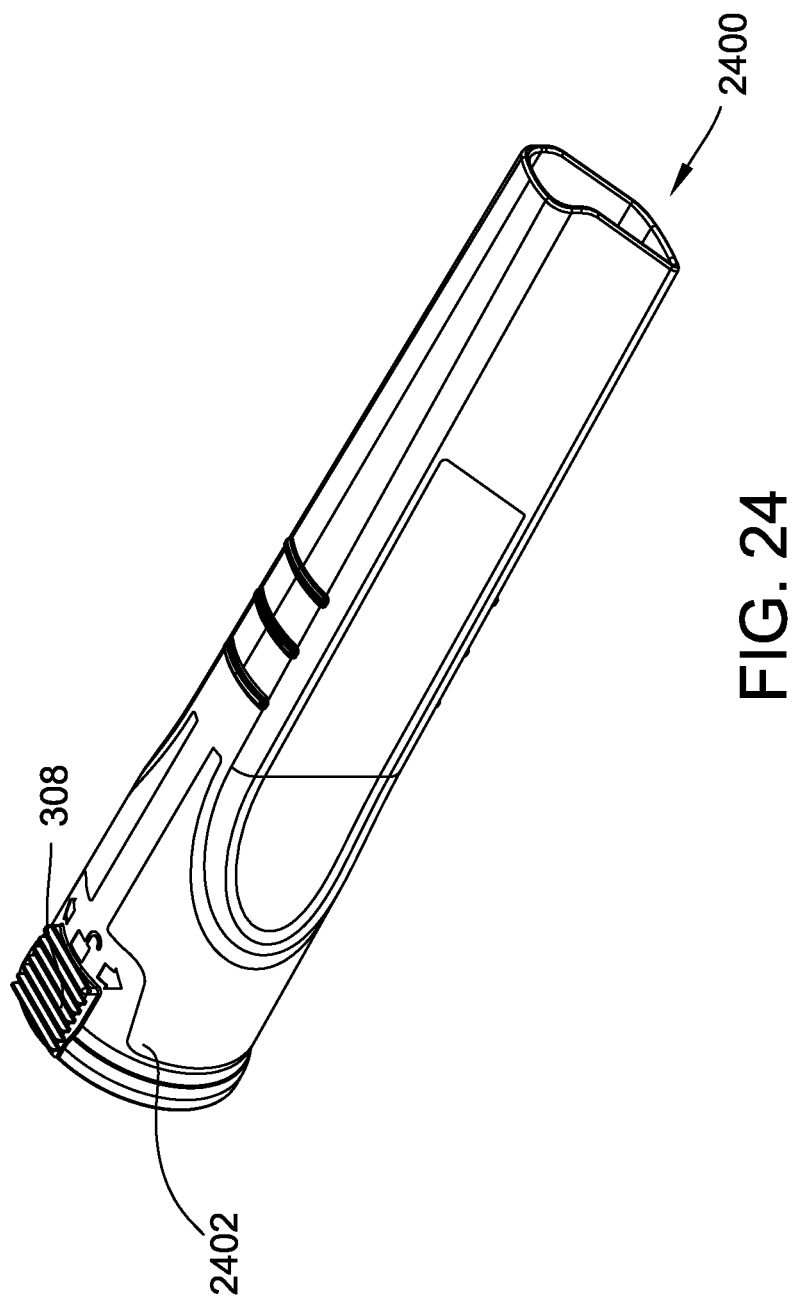
FIG. 24 is a perspective view of an example crevice tool including the row of teeth shown in FIG. 4.

FIG. 24 is a perspective view of vacuum cleaner accessory in the form of a crevice tool 2400. Crevice tool 2400 includes an attachment end 2402 that includes sequential teeth 308. Attachment end 2402 is configured to engage with an inner attachment tube of a vacuum cleaner hose, a vacuum tube assembly, or another vacuum cleaner accessory (e.g., inner attachment tube 204 of hose adapter 200).

Figure 25:
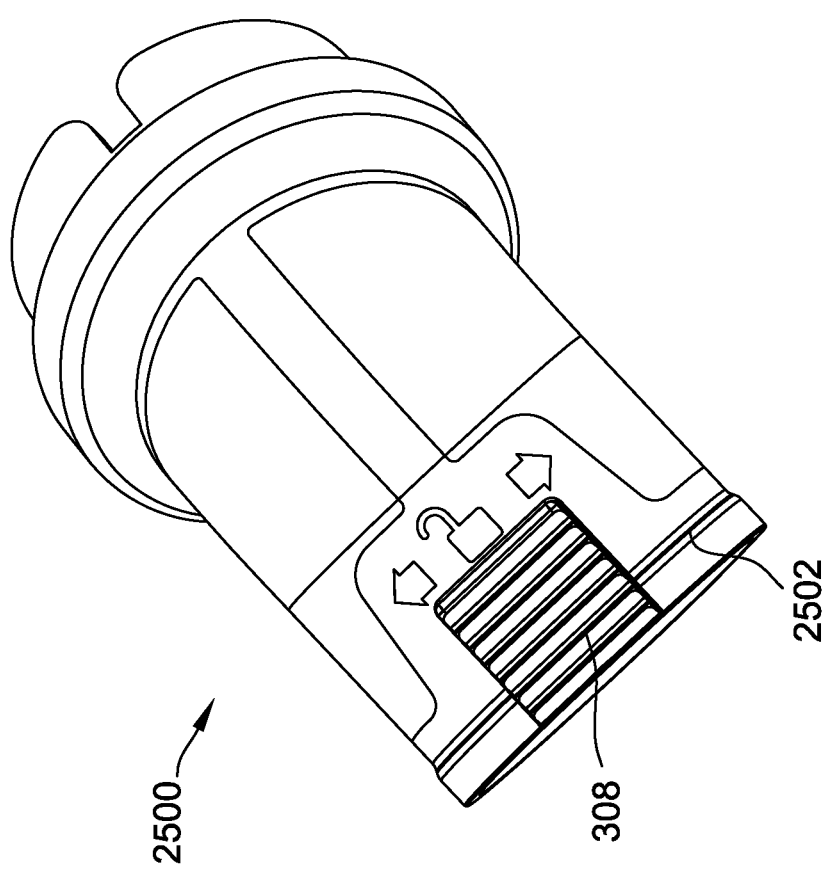
FIG. 25 is a perspective view of an example dusting brush including the row of teeth shown in FIG. 4.

FIG. 25 is a perspective view of vacuum cleaner accessory in the form of a dusting brush 2500. Dusting brush 2500 includes an attachment end 2502 that includes sequential teeth 308. Attachment end 2502 is configured to engage with an inner attachment tube of a vacuum cleaner hose, a vacuum tube assembly, or a vacuum cleaner accessory (e.g., first end 202 of vacuum tube assembly 140).

Each of attachment ends 2002, 2102, 2202, 2302, 2402, and 2502 may have substantially the same configuration as outer attachment tube 304 of vacuum tube 300.

Figure 26:
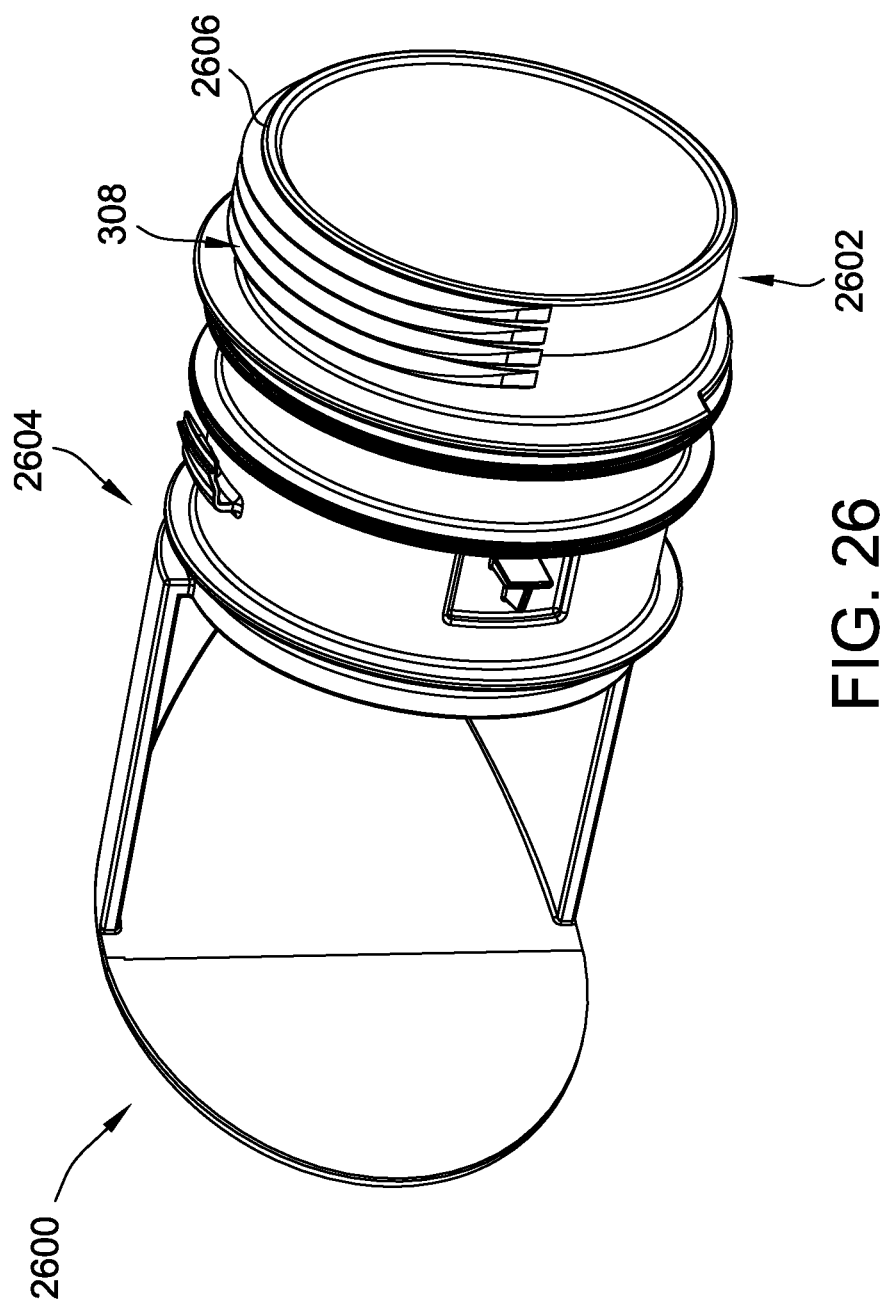
FIG. 26 is a perspective view of an example inlet port suitable for use with a vacuum cleaning system.

In some embodiments, components of the attachment mechanisms described herein may be implemented on the inlet port and/or the outlet port of a vacuum cleaning system. FIG. 26 is a perspective view of an example inlet port 2600 suitable for use in a vacuum cleaning system, such as a wet/dry vacuum cleaner, that includes sequential teeth 308 disposed along an attachment end 2602 of inlet port 2600. Attachment end 2602 is the portion of inlet port 2600 that extends or projects outward from the associated vacuum cleaning system for attachment to vacuum cleaning accessories, such as vacuum conduits, vacuum hoses, and vacuum wands or tubes. Inlet port 2600 also includes an internal portion 2604 that connects to a drum or canister of the associated vacuum cleaning system, and directs air into the drum or canister. Vacuum cleaning accessories that include vacuum locking tab 201 may be connected to inlet port 2600 by inserting an attachment end of the vacuum cleaner accessory into an outer attachment tube 2606 of inlet port 2600, and engaging latch tooth 224 (shown in FIGS. 2-3) with one of the plurality of teeth 308. In other embodiments, inlet port 2600 may include vacuum locking tab 201. In yet other embodiments, vacuum locking tab 201 and/or sequential teeth 308 may be implemented on the outlet port of a vacuum cleaning system.

Embodiments of the described systems achieve superior results as compared to prior art systems. For example, embodiments of the attachment mechanisms described herein include a vacuum locking tab and a plurality of teeth that mate with one another to form a tight seal between two vacuum cleaner accessories. Embodiments of the vacuum locking tab include a latch and a pivot extension that permits a latch tooth to ratchet through a series or row of teeth on a vacuum cleaner accessory. The latch tooth ratchets through sequential teeth until a tight seal is created between a first vacuum cleaner accessory and a second vacuum cleaner accessory. The vacuum locking tab then maintains the tight seal throughout the use of the vacuum cleaner accessories. Additionally, the relatively simple motion permits quick and easy assembly and disassembly of the vacuum cleaner accessories. Further, embodiments of the vacuum locking tab include an integrally formed S-shaped spring that biases the locking tab towards a latched position. The S-shaped spring evenly distributes stress throughout the spring, and prevents excessive wear of the spring as compared to other springs that have sharp corners, turns, or joints, Example embodiments of vacuum attachment mechanisms are described above in detail. The vacuum attachment mechanisms are not limited to the specific embodiments described herein, but rather, components of the vacuum attachment mechanisms may be used independently and separately from other components described herein. For example, the vacuum attachment mechanisms described herein may be used in vacuum cleaners other than backpack vacuum cleaners, including, without limitation, canister vacuum cleaners, wet/dry vacuum cleaners, floor vacuum cleaners, and stationary vacuum cleaners.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A vacuum cleaning system comprising:
   an inlet port;
   an outlet port;
   a suction unit fluidly connected between the inlet port and the outlet port, and operable to generate air flow from the inlet port to the outlet port;
   a first vacuum cleaner accessory fluidly connected to the inlet port and including an inner attachment tube; and
   a second vacuum cleaner accessory fluidly connected to the inlet port and including an outer attachment tube, the outer attachment tube sized and shaped to receive the inner attachment tube therein, wherein the first vacuum cleaner accessory is connected to the second vacuum cleaner accessory by an attachment mechanism comprising:
      a plurality of teeth arranged axially along an outer surface of the outer attachment tube; and
      a locking tab positioned on an outer surface of the inner attachment tube, the locking tab comprising:
         a pivot extension extending radially outward from the outer surface of the inner attachment tube;
         a latch pivotably connected to the pivot extension, the latch including a finger engagement portion and a latching portion located on opposite sides of the pivot extension, the latching portion including a latch tooth that extends from a bottom surface of the latching portion, wherein the latch tooth is positioned to engage at least one of the plurality of teeth upon insertion of the inner attachment tube into the outer attachment tube to secure the first vacuum cleaner accessory to the second vacuum cleaner accessory; and
         an S-shaped spring attached to the outer surface of the inner attachment tube and to the finger engagement portion, wherein the S-shaped spring biases the locking tab towards a latched position in which the latch tooth engages the teeth.

2. The vacuum cleaning system of claim 1, wherein the plurality of teeth are arranged to define a row of teeth, the row of teeth having a first side and a second side, wherein the first and second sides are open such that rotation of the first vacuum cleaner accessory relative to the second vacuum cleaner accessory disengages the latch tooth from the at least one of the plurality of teeth.

3. The vacuum cleaning system of claim 2, wherein depression of the finger engagement portion causes the latch tooth to disengage the row of teeth.

4. The vacuum cleaning system of claim 1, wherein the inner attachment tube includes a tapered end portion that tapers inwards towards an end of the inner attachment tube such that the inner attachment tube forms a friction fit with the outer attachment tube when the inner attachment tube is inserted into the outer attachment tube.

5. The vacuum cleaning system of claim 4, wherein the inner attachment tube includes a plurality of circumferential grooves defined along an outer surface of the tapered end portion, the plurality of circumferential grooves configured to limit friction between the inner attachment tube and the outer attachment tube.

6. The vacuum cleaning system of claim 5, wherein the plurality of grooves is defined by a plurality of circumferential rings and a plurality of recessed, tapered surfaces, wherein a proximal-most ring of the plurality of rings has a diameter sized to prevent insertion of the outer attachment tube beyond the proximal-most ring.

7. The vacuum cleaning system of claim 6, wherein a proximal-most tapered surface of the plurality of tapered surfaces has a greater taper angle than each of the other tapered surfaces.

8. The vacuum cleaning system of claim 1, wherein the first vacuum cleaner accessory and the locking tab are integrally formed as a single molded piece.

9. The vacuum cleaning system of claim 1, wherein the second vacuum cleaner accessory is a surface cleaning tool.

10. The vacuum cleaning system of claim 1, wherein the first vacuum cleaner accessory is one of a hose adapter, a vacuum tube, and a vacuum tube extension.

11. An attachment mechanism for connecting a first vacuum cleaner accessory to a second vacuum cleaner accessory, the attachment mechanism comprising:
a plurality of teeth arranged axially along an outer surface of an outer attachment tube of the first vacuum cleaner accessory; and
a locking tab positioned on an outer surface of an inner attachment tube of the second vacuum cleaner accessory, the outer attachment tube sized and shaped to receive the inner attachment tube therein, the locking tab comprising:
a pivot extension extending radially outward from the outer surface of the second vacuum cleaner accessory;
a latch pivotably connected to the pivot extension, the latch including a finger engagement portion and a latching portion located on opposite sides of the pivot extension, the latching portion including a latch tooth that extends from a bottom surface of the latching portion, wherein the latch tooth is positioned to engage at least one of the plurality of teeth upon insertion of the inner attachment tube into the outer attachment tube to secure the first vacuum cleaner accessory to the second vacuum cleaner accessory; and
an S-shaped spring attached to the outer surface of the inner attachment tube and a bottom surface of the finger engagement portion, wherein the S-shaped spring biases the locking tab towards a latched position in which the latch tooth engages the teeth.

12. The attachment mechanism of claim 11, wherein depression of the finger engagement portion exerts a force against the S-shaped spring and causes the locking tab to pivot about the pivot extension such that the latch tooth disengages from the at least one of the plurality of teeth.

13. The attachment mechanism of claim 11, wherein the second vacuum cleaner accessory, the locking tab, and the S-shaped spring are integrally formed as a single molded piece.

14. The attachment mechanism of claim 11, wherein the plurality of teeth are arranged to define a row of teeth, the row of teeth having a first side and a second side, wherein the first and second sides are open such that rotation of the first vacuum cleaner accessory relative to the second vacuum cleaner accessory disengages the latch tooth from the at least one of the plurality of teeth.

15. A method of connecting a first vacuum cleaner accessory including an outer attachment tube to a second vacuum cleaner accessory including an inner attachment tube, the first vacuum cleaner accessory including a plurality of teeth arranged axially along an outer surface of the outer attachment tube, the second vacuum cleaner accessory including a locking tab positioned on an outer surface of the inner attachment tube, the locking tab including a pivot extension extending from the outer surface of the second vacuum cleaner accessory, a latch pivotably connected to the pivot extension, and an S-shaped spring attached to the outer surface of the second vacuum cleaner accessory and a bottom surface of the latch, the latch including a finger engagement portion and a latching portion located on opposite sides of the pivot extension, the latching portion including a latch tooth that extends from a bottom surface of the latching portion, the method comprising:
aligning the outer attachment tube of the first vacuum cleaner accessory with the inner attachment tube of the second vacuum cleaner accessory;
inserting the inner attachment tube into the outer attachment tube to a sufficient depth such that the inner attachment tube sealingly engages the outer attachment tube, and
biasing the locking tab towards a latched position in which the latch tooth engages the teeth using the S-shaped spring; and
engaging at least one of the plurality of teeth with the latch tooth to secure the first and second vacuum accessories together in a sealed connection.

16. The method of claim 15 further comprising disengaging the latch tooth from the at least one of the plurality of teeth.

17. The method of claim 16 further comprising removing the inner attachment tube from the outer attachment tube.

18. The method of claim 16, wherein disengaging the latch tooth from the at least one of the plurality of teeth includes rotating the first and second vacuum cleaner accessories relative to one another such that the latch tooth rotates beyond an edge of the plurality of teeth.

19. The method of claim 16, wherein disengaging the latch tooth from the at least one of the plurality of teeth includes depressing the finger engagement portion such that the locking tab pivots about the pivot extension and the latch tooth is disengaged from the at least one of the plurality of teeth.

20. The vacuum cleaning system of claim 1, wherein the first vacuum cleaner accessory, the locking tab, and the S-shaped spring are integrally formed as a single piece.

21. The vacuum cleaning system of claim 20, wherein the S-shaped spring has a first end and a second end, the first end is integrally formed with the bottom surface of the finger engagement portion and the second end is integrally formed with the outer surface of the inner attachment tube.

* * * * *